US012689029B2

(12) United States Patent
Jin et al.

(10) Patent No.: US 12,689,029 B2
(45) Date of Patent: Jul. 21, 2026

(54) POSITIVE ELECTRODE ACTIVE MATERIAL COMPOSITION, POSITIVE ELECTRODE PLATE, BATTERY, AND ELECTRICAL APPARATUS

(71) Applicant: CONTEMPORARY AMPEREX TECHNOLOGY CO., LIMITED, Ningde (CN)

(72) Inventors: Haizu Jin, Ningde (CN); Xiaofu Xu, Ningde (CN); Yonghuang Ye, Ningde (CN); Yibo Shang, Ningde (CN); Jianfu He, Ningde (CN); Jiao Yang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/294,326

(22) Filed: Aug. 8, 2025

(65) Prior Publication Data

US 2025/0364543 A1 Nov. 27, 2025

Related U.S. Application Data

(63) Continuation of application No. PCT/CN2023/089002, filed on Apr. 18, 2023.

(51) Int. Cl.
*H01M 4/525* (2010.01)
*H01M 4/36* (2006.01)
(Continued)

(52) U.S. Cl.
CPC .......... *H01M 4/366* (2013.01); *H01M 4/525* (2013.01); *H01M 4/5825* (2013.01);
(Continued)

(58) Field of Classification Search
CPC .... H01M 4/366; H01M 4/525; H01M 4/5825; H01M 4/623; H01M 4/625; H01M 4/661; H01M 2004/021; H01M 2004/028
See application file for complete search history.

(56) References Cited

U.S. PATENT DOCUMENTS

2009/0220860 A1 9/2009 Xi et al.
2014/0099560 A1* 4/2014 Parans Paranthaman .................. H01M 4/483 429/405

(Continued)

FOREIGN PATENT DOCUMENTS

CN 101207197 A 6/2008
CN 103618084 A 3/2014

(Continued)

OTHER PUBLICATIONS

CN112952050A. Jun. 11, 2021. English machine translation by EPO. (Year: 2021).*

(Continued)

*Primary Examiner* — James Lee
(74) *Attorney, Agent, or Firm* — K&L Gates LLP

(57) ABSTRACT

A positive electrode active material composition, a positive electrode plate, a battery, and an electrical apparatus are provided. The composition includes a first positive electrode active material and a second positive electrode active material having a crystal form different from that of the first. The first active material comprises a phosphate. The particle size distribution curve of the composition exhibits at least two volume distribution peaks. The peak with the highest intensity is defined as the first peak, with a corresponding volume-based particle size Dv1. The peak with the second highest intensity is defined as the second peak, with particle size Dv2. The relative difference in particle sizes satisfies the (Continued)

5 condition $0<|Dv1-Dv2|/Dv1\leq 50$. This dual-peak structure improves the electrochemical performance of the electrode.

16 Claims, 3 Drawing Sheets

(51) Int. Cl.
*H01M 4/58* (2010.01)
*H01M 4/62* (2006.01)
*H01M 4/66* (2006.01)
*H01M 4/02* (2006.01)

(52) U.S. Cl.
CPC .......... *H01M 4/623* (2013.01); *H01M 4/625* (2013.01); *H01M 4/661* (2013.01); *H01M 2004/021* (2013.01); *H01M 2004/028* (2013.01)

(56) References Cited

U.S. PATENT DOCUMENTS

| | | | | |
|---|---|---|---|---|
| 2020/0006758 | A1* | 1/2020 | Wi | H01M 4/625 |
| 2020/0067101 | A1* | 2/2020 | Pan | C09D 5/24 |
| 2022/0123366 | A1 | 4/2022 | Jiang et al. | |
| 2023/0170481 | A1* | 6/2023 | Yue | H01M 4/58 |

FOREIGN PATENT DOCUMENTS

| | | | | |
|---|---|---|---|---|
| CN | 110676428 | A | | 1/2020 |
| CN | 112952050 | A | | 6/2021 |
| CN | 114068920 | A | | 2/2022 |
| CN | 115053379 | A | | 9/2022 |
| CN | 115176370 | A | | 10/2022 |
| CN | 115241449 | A | | 10/2022 |
| CN | 115528296 | A | | 12/2022 |
| EP | 2437336 | A2 | | 4/2012 |
| EP | 3708542 | A1 | | 9/2020 |
| IN | 201617001994 | A | | 8/2016 |
| JP | 2015144071 | A | * | 8/2015 |
| KR | 20170049459 | A | | 5/2017 |
| KR | 20190058360 | A | | 5/2019 |
| WO | 2007055087 | A1 | | 5/2007 |
| WO | 2015026180 | A1 | | 2/2015 |

OTHER PUBLICATIONS

Swain, Pravati, et al. "Carbon coating on the current collector and LiFePO4 nanoparticles—Influence of sp2 and sp3-like disordered carbon on the electrochemical properties." Journal of Power Sources 293 (2015): 613-625. (Year: 2015).*

JP2015144071A. Aug. 6, 2015. English machine translation by EPO. (Year: 2015).*

The International Search Report received in the counterpart International Application No. PCT/CN2023/089002, dated Dec. 21, 2023, 4 pages with English translation.

The Notice of Registration received in the counterpart CN Application No. 202380009879.3, dated Jun. 3, 2024, 7 pages with English translation.

The First Office Action received in the counterpart CN Application No. 202380009879.3, dated Apr. 18, 2024, 10 pages with English translation.

The Notice of Registration received in the counterpart CN Application No. 202410947464.7, dated Nov. 13, 2025, 6 pages with English translation.

Extended European Search Report, mailed May 22, 2026, for corresponding European Patent Application Serial No. 23933378.4.

Zhang et al., "A review of the Doping Modification of LifePO4 as a Cathode Material for Lithium Ion Batteries", International Journal of Electrochemical Science, vol. 15, Issue 12, 2020, pp. 12041-12067.

Yan et al., "A review on doping/coating of nickel-rich cathode materials for lithium-ion batteries", Journal of Alloys and Compounds, vol. 819, (2019) 153048, 14 pages.

* cited by examiner

POSITIVE ELECTRODE ACTIVE MATERIAL COMPOSITION, POSITIVE ELECTRODE PLATE, BATTERY, AND ELECTRICAL APPARATUS

CROSS-REFERENCE TO RELATED APPLICATIONS

The present application is a continuation of International Application No. PCT/CN2023/089002, filed on Apr. 18, 2023, which is incorporated herein by reference in its entirety.

TECHNICAL FIELD

The present application relates to a positive electrode active material composition, a positive electrode plate, a battery, and an electrical apparatus.

BACKGROUND

In recent years, batteries have been widely used in energy storage power systems such as hydropower, thermal power, wind power and solar power stations, as well as the fields of power tools, electric bicycles, electric motorcycles, electric vehicles, military equipment, aerospace and other fields. With the continuous expansion of battery application fields, the demand for battery energy density and service life is getting higher and higher.

SUMMARY OF THE INVENTION

The present application provides a positive electrode active material composition, a positive electrode plate, a battery and an electrical apparatus, which enables the battery to have high energy density, low costs and good service life at the same time.

In a first aspect, the present application provides a positive electrode active material composition, comprising a first positive electrode active material and a second positive electrode active material having a crystal form different from that of the first positive electrode active material; the first positive electrode active material comprises a phosphate, the particle size distribution curve of the positive electrode active material composition has at least two volume distribution peaks, the volume distribution peak with the maximal peak intensity is marked as a first peak, the volume distribution particle size corresponding to the maximal peak intensity of the first peak is marked as Dv1, the volume distribution peak with the submaximal peak intensity is marked as a second peak, and the volume distribution particle size corresponding to the maximal peak intensity of the second peak is marked as Dv2, with $0<|Dv1-Dv2|/Dv1\leq 50$.

By making the positive electrode active material composition comprise a first positive electrode active material and a second positive electrode active material with different crystal forms, and making the particle size distribution curve of the positive electrode active material composition satisfy $0<|Dv1-Dv2|/Dv1\leq 50$, the first positive electrode active material and the second positive electrode active material can be densely stacked, thereby improving the actual stacking density of the positive electrode active material composition, improving the compacted density and compacted density efficiency of the positive electrode plate, and in turn enabling the battery using the positive electrode active material composition to have higher energy density and longer service life.

In any embodiment, the volume distribution particle size Dv50 of the first positive electrode active material is 0.25 μm to 12.5 μm.

In any embodiment, the volume distribution particle size Dv50 of the second positive electrode active material is 2.5 μm to 16.5 μm.

In any embodiment, the volume distribution particle size Dv50 of the first positive electrode active material is 0.25 μm to 3.5 μm, and the particle size distribution curve of the positive electrode active material composition satisfies:

a. $\leq|Dv1-Dv2|/Dv1\leq 50$, optionally, $0.46\leq|Dv1-Dv2|/Dv1\leq 39.6$; and/or, $0.3\ \mu m\leq Dv1\leq 17.8\ \mu m$, optionally, $0.35\ \mu m\leq Dv1\leq 12.1\ \mu m$; and/or, $0.3\ \mu m\leq Dv2\leq 17.8\ \mu m$, optionally, $0.46\ \mu m\leq Dv2\leq 14.2\ \mu m$.

This allows the first positive electrode active material and the second positive electrode active material to be stacked more densely, further improving the actual stacking density of the positive electrode active material composition, improving the compacted density and compacted density efficiency of the positive electrode plate, and thereby enabling the battery using the positive electrode active material composition to have higher energy density and/or longer service life.

In any embodiment, the volume distribution particle size Dv50 of the first positive electrode active material is 3.5 μm to 12.5 μm, and the particle size distribution curve of the positive electrode active material composition satisfies:

b. $\leq|Dv1-Dv2|/Dv1\leq 6.0$, optionally, $0.34\leq|Dv1-Dv2|/Dv1\leq 3.8$; and/or, $2.0\ \mu m\leq Dv1\leq 12.5\ \mu m$, optionally, $3.0\ \mu m\leq Dv1\leq 12.3\ \mu m$; and/or, $2.0\ \mu m\leq Dv2\leq 15.0\ \mu m$, optionally, $3.4\ \mu m\leq Dv2\leq 14.3\ \mu m$.

This allows the first positive electrode active material and the second positive electrode active material to be stacked more densely, further improving the actual stacking density of the positive electrode active material composition, improving the compacted density and compacted density efficiency of the positive electrode plate, and thereby enabling the battery using the positive electrode active material composition to have higher energy density and/or longer service life.

In any embodiment, the morphology of the first positive electrode active material includes one or more of monocrystals and polycrystals, and the morphology of the second positive electrode active material includes one or more of monocrystals and polycrystals.

In any embodiment, the volume distribution particle size Dv50 of the first positive electrode active material with a monocrystalline morphology is 0.25 μm to 3.5 μm, and optionally 0.35 μm to 2.5 μm.

In any embodiment, the volume distribution particle size Dv10 of the first positive electrode active material with a monocrystalline morphology is 0.05 μm to 1.5 μm, and optionally 0.1 μm to 1.0 μm.

In any embodiment, the volume distribution particle size Dv50 of the first positive electrode active material with a polycrystalline morphology is 3.5 μm to 12.5 μm, and optionally 3.8 μm to 10.5 μm.

In any embodiment, the volume distribution particle size Dv10 of the first positive electrode active material with a polycrystalline morphology is 0.1 μm to 5.0 μm, and optionally 0.5 μm to 4.5 μm.

In any embodiment, the volume distribution particle size Dv50 of the second positive electrode active material with a monocrystalline morphology is 2.5 μm to 16.5 μm, and optionally 3.0 μm to 8.5 μm.

In any embodiment, the volume distribution particle size Dv10 of the second positive electrode active material with a monocrystalline morphology is 0.3 μm to 8 μm, and optionally 1.0 μm to 3.5 μm.

In any embodiment, the volume distribution particle size Dv50 of the second positive electrode active material with a polycrystalline morphology is 2.5 μm to 16.5 μm, and optionally 3.0 μm to 15.5 μm.

In any embodiment, the volume distribution particle size Dv10 of the second positive electrode active material with a polycrystalline morphology is 0.5 μm to 12 μm, and optionally 1.0 μm to 8.5 μm.

When the volume distribution particle size of the first positive electrode active material and/or the second positive electrode active material is within the above range, it can make the battery have higher energy density, reduce side reactions, lower interface impedance, and thus make the battery have longer service life.

In any embodiment, based on the total weight of the positive electrode active material composition, the weight content of the first positive electrode active material is marked as $w_a$, and the weight content of the second positive electrode active material is marked as $w_b$, then $w_a$ is selected from the range of 0.5% to 99.5%, and optionally from the range of 2% to 95%; and/or $w_b$ is selected from the range of 0.5% to 99.5%, and optionally from the range of 5% to 98%.

When the content of the first positive electrode active material and/or the second positive electrode active material is within the above range, the battery can have higher energy density and/or longer service life.

In any embodiment, the powder compacted density $P_1$ of the first positive electrode active material at 30000N is 1.89 g/cm$^3$ or more, optionally 1.95 g/cm$^3$ or more, more optionally 1.98 g/cm$^3$ or more, further optionally 2.0 g/cm$^3$ or more, still further optionally 2.2 g/cm$^3$ or more, still further optionally 2.2 g/cm$^3$ or more and 2.8 g/cm$^3$ or less, or 2.2 g/cm$^3$ or more and 2.65 g/cm$^3$ or less.

In any embodiment, the powder compacted density $P_2$ of the second positive electrode active material at 30000N is greater than or equal to 2.90 g/cm$^3$, optionally greater than or equal to 3.1 g/cm$^3$, and more optionally greater than or equal to 3.3 g/cm$^3$.

When the powder compacted density of the first positive electrode active material and/or the second positive electrode active material is within the above range, the battery can have higher energy density.

In any embodiment, the BET specific surface area of the second positive electrode active material is less than or equal to 1.73 m$^2$/g, optionally less than or equal to 1.5 m$^2$/g, and more optionally 0.28 m$^2$/g to 1.5 m$^2$/g. This can reduce side reactions and improve the battery's cycling performance.

In any embodiment, the first positive electrode active material comprises a compound represented by formula (I), $$Li_aA_xMn_{1-y}B_yP_{1-z}C_zO_{4-n}D_n \qquad (I)$$

A includes one or more elements selected from group IA, group IIA, group IIIA, group IIB, group VB and group VIB; B includes one or more elements selected from group IA, group IIA, group IIIA, group IVA, group VA, group IIB, group IVB, group VB, group VIB and group VIII; C includes one or more elements selected from group IIIA, group IVA, group VA and group VIA; D includes one or more elements selected from group VIA and group VIIA; a is selected from the range of 0.85 to 1.15; x is selected from the range of 0 to 0.1; y is selected from the range of 0.001 to 0.999; z is selected from the range of 0 to 0.5; and n is selected from the range of 0 to 0.5.

By doping a specific element in a specific amount at the Mn site, and optionally at the Li site, P site and/or O site, of the compound $LiMnPO_4$, improved rate performance can be obtained, while reducing the dissolution of Mn and the doping element at the Mn site, obtaining improved cycling performance and/or high-temperature stability, and also increasing the gram capacity and compacted density of the material.

In any embodiment, A includes one or more elements selected from Rb, Cs, Be, Ca, Sr, Ba, Ga, In, Cd, V, Ta, Cr, Zn, Al, Na, K, Mg, Nb, Mo and W, and optionally includes one or more elements selected from Zn, Al, Na, K, Mg, Nb, Mo and W.

In any embodiment, B includes one or more elements selected from Rb, Cs, Be, Ca, Sr, Ba, In, Pb, Bi, Cd, Hf, Ta, Cr, Ru, Rh, Pd, Os, Ir, Pt, Zn, Al, Na, K, Mg, Mo, W, Ti, V, Zr, Fe, Ni, Co, Ga, Sn, Sb, Nb and Ge, and optionally includes one or more elements selected from Zn, Al, Na, K, Mg, Mo, W, Ti, V, Zr, Fe, Ni, Co, Ga, Sn, Sb, Nb and Ge.

In any embodiment, C includes one or more elements selected from B (boron), S, Si and N.

In any embodiment, D includes one or more elements selected from S, F, Cl and Br.

In any embodiment, A includes any element selected from Zn, Al, Na, K, Mg, Nb, Mo and W, and optionally includes any element selected from Mg and Nb.

In any embodiment, B includes one or more elements selected from Ti, V, Zr, Fe, Ni, Mg, Co, Ga, Sn, Sb, Nb and Ge, optionally includes at least two elements selected from Ti, V, Zr, Fe, Ni, Mg, Co, Ga, Sn, Sb, Nb and Ge, further optionally includes at least two elements selected from Fe, Ti, V, Ni, Co and Mg, further optionally includes at least two elements selected from Fe, Ti, V, Co and Mg, and still further optionally includes Fe and one or more elements selected from Ti, V, Co and Mg.

In any embodiment, C includes any element selected from B (boron), S, Si and N, and optionally S.

In any embodiment, D includes any element selected from S, F, Cl and Br, and optionally F.

By selecting the Li-site doping element within the above range, the lattice change rate during the delithiation process can be further reduced, thereby further improving the rate performance of the battery. By selecting the Mn-site doping element within the above range, the electronic conductivity can be further improved and the lattice change rate can be further reduced, thereby improving the rate performance and gram capacity of the battery. By selecting the P-site doping element within the above range, the rate performance of the battery can be further improved. By selecting the O-site doping element within the above range, the side reactions at the interface can be further reduced and the high-temperature performance of the battery can be improved.

In any embodiment, a is selected from the range of 0.9 to 1.1, and optionally from the range of 0.97 to 1.01.

In any embodiment, x is selected from the range of 0.001 to 0.005.

In any embodiment, y is selected from the range of 0.001 to 0.5, optionally from the range of 0.01 to 0.5, and optionally from the range of 0.25 to 0.5.

In any embodiment, z is selected from the range of 0.001 to 0.5, optionally from the range of 0.001 to 0.1, and more optionally from the range of 0.001 to 0.005.

In any embodiment, n is selected from the range of 0 to 0.1, and optionally from the range of 0.001 to 0.005.

By selecting the y value within the above range, the gram capacity and rate performance of the first positive electrode active material can be further improved. By selecting the x value within the above range, the kinetic performance of the first positive electrode active material can be further improved. By selecting the z value within the above range, the rate performance of the battery can be further improved. By selecting the n value within the above range, the high-temperature performance of the battery can be further improved.

In any embodiment, x is 0, z is selected from the range of 0.001 to 0.5, and n is selected from the range of 0.001 to 0.1; or, x is selected from the range of 0.001 to 0.1, z is 0, and n is selected from the range of 0.001 to 0.1; or, x is selected from the range of 0.001 to 0.1, z is selected from the range of 0.001 to 0.5, and n is 0; or, x is 0, z is 0, and n is selected from the range of 0.001 to 0.1; or, x is 0, z is selected from the range of 0.001 to 0.5, and n 0; or, x is selected from the range of 0.001 to 0.1, z is selected from the range of 0.001 to 0.5, and n is selected from the range of 0.001 to 0.1.

By doping a specific element in a specific amount at the Mn site of the compound $LiMnPO_4$ and optionally at the Li site, P site and/or O site, especially doping a specific element in a specific amount at the Mn site and P site of $LiMnPO_4$ or at the Li site, Mn site, P site and O site of $LiMnPO_4$, the rate performance can be improved, the dissolution of Mn and the doping element at the Mn site can be reduced, the cycling performance and/or high-temperature stability can be improved, and the gram capacity and compacted density of the first positive electrode active material can be increased.

In any embodiment, y:z is selected from the range of 0.002 to 999, optionally from the range of 0.025 to 999 or the range of 0.002 to 500, and further optionally from the range of 0.2 to 600. As a result, the defects of the first positive electrode active material can be reduced, and the integrity of the framework structure of the first positive electrode active material can be improved, thereby effectively improving the structural stability of the first positive electrode active material and in turn improving the cycling stability of the battery.

In any embodiment, z:n is selected from the range of 0.002 to 500, optionally from the range of 0.2 to 100, and more optionally from the range of 0.2 to 50. As a result, the defects of the first positive electrode active material can be further reduced, and the integrity of the framework structure of the first positive electrode active material can be further improved, thereby effectively improving the structural stability of the first positive electrode active material and improving the cycling stability of the battery.

In any embodiment, A includes one or more elements selected from Zn, Al, Na, K, Mg, Nb, Mo and W; B includes one or more elements selected from Ti, V, Zr, Fe, Ni, Mg, Co, Ga, Sn, Sb, Nb and Ge; C includes one or more elements selected from B (boron), S, Si and N; D includes one or more elements selected from S, F, Cl and Br; a is selected from the range of 0.9 to 1.1, x is selected from the range of 0.001 to 0.1, y is selected from the range of 0.001 to 0.5, z is selected from the range of 0.001 to 0.1, and n is selected from the range of 0.001 to 0.1.

By simultaneously doping specific elements at specific amounts at the Li site, Mn site, P site and O site of the compound $LiMnPO_4$, improved rate performance can be obtained, while reducing the dissolution of Mn and the doping element at the Mn site, obtaining improved cycling performance and/or high-temperature stability as well as increased gram capacity and compacted density of the first positive electrode active material.

In any embodiment, B includes one or more elements selected from Zn, Al, Na, K, Mg, Mo, W, Ti, V, Zr, Fe, Ni, Co, Ga, Sn, Sb, Nb and Ge, and optionally includes one or more elements selected from Zn, Fe, Ti, V, Ni, Co and Mg; C includes one or more elements selected from B (boron), Si, N and S; a is selected from the range of 0.9 to 1.1, x is 0, y is selected from the range of 0.001 to 0.5, z is selected from the range of 0.001 to 0.1, and n is 0.

By simultaneously doping specific elements at specific amounts at the Mn site and P site of the compound $LiMnPO_4$, it can improve the rate performance, reduce the dissolution of Mn and the doping element at the Mn site, improve the cycling performance and/or high-temperature stability, and increase the gram capacity and compacted density of the first positive electrode active material.

In any embodiment, (1−y):y is in the range of 0.1-999, optionally in the range of 0.1-10 or in the range of 0.67-999, more optionally in the range of 1 to 10, further optionally in the range of 1 to 4, and still further optionally in the range of 1.5 to 3. When the above conditions are satisfied, the energy density and cycling performance of the first positive electrode active material can be further improved.

In any embodiment, a:x is in the range of 1 to 1200, optionally in the range of 9 to 1100, and more optionally in the range of 190-998. When the above conditions are satisfied, the energy density and cycling performance of the first positive electrode active material can be further improved.

In any embodiment, z:(1−z) is 1:9 to 1:999, and optionally 1:499 to 1:249. When the above conditions are satisfied, the energy density and cycling performance of the first positive electrode active material can be further improved.

In any embodiment, the first positive electrode active material comprises an inner core and a shell cladding the inner core, the inner core comprises the compound represented by formula (I); the shell comprises one or more cladding layers; and each cladding layer has ionic conductivity and/or electronic conductivity.

By providing a cladding layer with ionic conductivity and/or electronic conductivity on the surface of the inner core, a first positive electrode active material with an inner core-shell structure is provided, and applying the first positive electrode active material to a battery can improve the high-temperature cycling performance, cycling stability and high-temperature storage performance of the battery.

In any embodiment, the one or more cladding layers each independently comprise one or more selected from pyrophosphate, phosphate, carbon, doped carbon, oxide, boride and polymer.

In any embodiment, the shell comprises a cladding layer; optionally, the cladding layer comprises one or more selected from pyrophosphate, phosphate, carbon, doped carbon, oxide, boride and polymer.

The above materials can be used to obtain a cladding layer with ionic conductivity and/or electronic conductivity, thereby improving the high-temperature cycling performance, cycling stability and high-temperature storage performance of the battery.

In any embodiment, the shell comprises a first cladding layer cladding the inner core and a second cladding layer cladding the first cladding layer; optionally, the first cladding layer and the second cladding layer each independently comprise one or more selected from pyrophosphate, phosphate, carbon, doped carbon, oxide, boride and polymer; more optionally, the first cladding layer comprises one or more selected from pyrophosphate, phosphate, oxide and boride, and the second cladding layer comprises one or more selected from carbon and doped carbon. The use of a first cladding layer of a specific material and a second cladding layer of a specific material can further improve the rate performance and further reduce the dissolution of Mn and Mn-site doping elements, thereby improving the cycling performance and/or high-temperature stability of the battery.

In any embodiment, the shell comprises a first cladding layer cladding the inner core, a second cladding layer cladding the first cladding layer and a third cladding layer cladding the second cladding layer; optionally, the first cladding layer, the second cladding layer and the third cladding layer each independently comprise one or more selected from pyrophosphate, phosphate, carbon, doped carbon, oxide, boride and polymer; more optionally, the first cladding layer comprises pyrophosphate, the second cladding layer comprises one or more selected from phosphate, oxide and boride, and the third cladding layer comprises one or more selected from carbon and doped carbon. The use of a first cladding layer of a specific material, a second cladding layer of a specific material, and a third cladding layer of a specific material further improves the rate performance, further reduces the dissolution of Mn and Mn-site doping elements, thereby improving the cycling performance and/or high-temperature stability of the battery, and further increasing the gram capacity and compacted density of the first positive electrode active material.

In any embodiment, the pyrophosphate is $M_b(P_2O_7)_c$; and/or, the phosphate is $X_m(PO_4)_q$; and/or, the doping element in the doped carbon includes one or more selected from group IIIA, group VA, group VIA and group VIIA; and/or, the oxide is $M'_dO_e$; and/or, the boride is $Z_vB_w$; and/or, the polymer includes one or more selected from polysaccharides and their derivatives, polysiloxanes; M, X and Z each independently include one or more element selected from group IA, group IIA, group IIIA, group IB, group IIB, group IVB, group VB, group VIIB and group VIII; b is selected from the range of 1 to 4; c is selected from the range of 1 to 6; m is selected from the range of 1 to 2; q is selected from the range of 1 to 4; M' includes one or more elements selected from alkali metals, alkaline earth metals, transition metals, group IIIA elements, group IVA elements, lanthanides and Sb; d is greater than 0 and less than or equal to 2; e is greater than 0 and less than or equal to 5; v is selected from the range of 1 to 7; and w is selected from the range of 1 to 2.

By using the above materials as the cladding layer, the dissolution of Mn and Mn-site doping elements can be further reduced, the gram capacity and compacted density of the first positive electrode active material can be further increased, and the rate performance, high-temperature cycling performance and high-temperature storage performance of the battery can be further improved.

In any embodiment, M, X and Z each independently include one or more elements selected from Li, Fe, Ni, Mg, Co, Cu, Zn, Ti, Ag, Zr, Nb, Mn and Al.

In any embodiment, the doping element in the doped carbon includes one or more selected from nitrogen, phosphorus, sulfur, boron and fluorine.

In any embodiment, M' includes one or more elements selected from Li, Be, B, Na, Mg, Al, Si, P, K, Ca, Sc, Ti, V, Cr, Mn, Fe, Co, Ni, Cu, Zn, Ga, Ge, As, Se, Sr, Y, Zr, Nb, Mo, Tc, Ru, Rh, Pd, Ag, Cd, In, Sn, Sb, Te, W, La and Ce, and optionally includes one or more elements selected from Mg, Al, Si, Zn, Zr and Sn.

In any embodiment, the polysiloxane is selected from one or more of linear polysiloxane and cyclic polysiloxane.

In any embodiment, the polysaccharide is selected from one or more of plant polysaccharide and marine polysaccharide.

By using the above-mentioned specific material as the cladding layer, the dissolution of Mn and Mn-site doping elements can be further reduced, and the high-temperature cycling performance and high-temperature storage performance of the battery can be further improved.

In any embodiment, the first positive electrode active material comprises an inner core and a shell cladding the inner core, the inner core comprises $Li_aMn_{1-y}ByP_{1-z}C_zO_4$, a is selected from the range of 0.9 to 1.1, y is selected from the range of 0.001 to 0.5, z is selected from the range of 0.001 to 0.1, B includes one or more elements selected from Ti, V, Zr, Fe, Ni, Mg, Co, Ga, Sn, Sb, Nb and Ge, and C includes one or more elements selected from B (boron), S, Si and N; the shell comprises a first cladding layer cladding the inner core and a second cladding layer cladding the first cladding layer, the first cladding layer comprises pyrophosphate $MP_2O_7$ and phosphate $XPO_4$, M and X each independently include one or more elements selected from Li, Fe, Ni, Mg, Co, Cu, Zn, Ti, Ag, Zr, Nb and Al; and the second cladding layer comprises carbon.

In any embodiment, the first positive electrode active material comprises an inner core and a shell cladding the inner core, the inner core comprises $Li_aMn_{1-y}ByP_{1-z}C_zO_4$, a is selected from the range of 0.9 to 1.1, y is selected from the range of 0.001 to 0.5, z is selected from the range of 0.001 to 0.1, B includes one or more elements selected from Ti, V, Zr, Fe, Ni, Mg, Co, Ga, Sn, Sb, Nb and Ge, and C includes one or more elements selected from B (boron), S, Si and N; the shell comprises a first cladding layer cladding the inner core, a second cladding layer cladding the first cladding layer and a third cladding layer cladding the second cladding layer, the first cladding layer comprises pyrophosphate $Li_fQP_2O_7$ and/or $Q_g(P_2O_7)_h$, $0 \leq f \leq 2$, $1 \leq g \leq 4$, $1 \leq h \leq 6$, the Q in the pyrophosphate $Li_fQP_2O_7$ and/or $Q_g(P_2O_7)_h$ each independently includes one or more elements selected from Fe, Ni, Mg, Co, Cu, Zn, Ti, Ag, Zr, Nb and Al; the second cladding layer comprises crystalline phosphate $XPO_4$, X includes one or more elements selected from Li, Fe, Ni, Mg, Co, Cu, Zn, Ti, Ag, Zr, Nb and Al; and the third cladding layer comprises carbon.

By doping lithium manganese phosphate with specific elements and cladding its surface, the dissolution of Mn during lithium (de)intercalation can be effectively reduced, while promoting the migration of lithium ions, thereby improving the rate performance of the battery and enhancing the cycling performance and high-temperature performance of the battery.

In any embodiment, the one or more cladding layers in the shell that are farthest from the inner core each independently comprise one or more selected from polysiloxanes, polysaccharides and polysaccharide derivatives. As a result, the uniformity of cladding can be improved, and the interfacial side reactions caused by high voltage can be effectively blocked, thereby improving the high-temperature cycling performance and high-temperature storage performance of the first positive electrode active material; and the cladding layer has good ionic conductivity, which helps to improve the gram capacity of the first positive electrode active material while reducing the heat generation of the battery.

In any embodiment, the polysiloxane comprises a structural unit represented by formula (i),

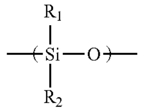

(i)

$R_1$ and $R_2$ are independently selected from H, —COOH, —OH, —SH, —CN, —SCN, amino, phosphate, carboxylate, amido, aldehyde, sulfonyl, polyether segment, C1-C20 aliphatic hydrocarbon groups, C1-C20 halogenated aliphatic hydrocarbon groups, C1-C20 heteroaliphatic hydrocarbon groups, C1-C20 halogenated heteroaliphatic hydrocarbon groups, C6-C20 aromatic hydrocarbon groups, C6-C20 halogenated aromatic hydrocarbon groups, C2-C20 heteroaromatic hydrocarbon groups and C2-C20 halogenated heteroaromatic hydrocarbon groups; optionally, $R_1$ and $R_2$ are independently selected from H, amino, phosphate, polyether segment, C1-C8 alkyl, C1-C8 halogenated alkyl, C1-C8 heteroalkyl, C1-C8 halogenated heteroalkyl, C2-C8 alkenyl and C2-C8 halogenated alkenyl.

In any embodiment, the polysiloxane further comprises an end-capping group, and the end-capping group includes one or more of the group consisting of the following functional groups: polyether, C1-C8 alkyl, C1-C8 haloalkyl, C1-C8 heteroalkyl, C1-C8 haloheteroalkyl, C2-C8 alkenyl, C2-C8 haloalkenyl, C6-C20 aromatic hydrocarbon group, C1-C8 alkoxy, C2-C8 epoxy, hydroxyl, C1-C8 hydroxyalkyl, amino, C1-C8 aminoalkyl, carboxyl, and C1-C8 carboxylalkyl.

In any embodiment, the polysiloxane includes one or more selected from polydimethylsiloxane, polydiethylsiloxane, polymethylethylsiloxane, polymethylvinylsiloxane, polyphenylmethylsiloxane, polymethylhydrogensiloxane, carboxyl functionalized polysiloxane, epoxy-terminated polysiloxane, methoxy-terminated polydimethylsiloxane, hydroxypropyl-terminated polydimethylsiloxane, polymethylchloropropylsiloxane, hydroxy-terminated polydimethylsiloxane, polymethyltrifluoropropylsiloxane, perfluorooctylmethylpolysiloxane, aminoethylaminopropylpolydimethylsiloxane, polyether-terminated polydimethylsiloxane, aminopropyl-branched polysiloxane, aminopropyl-terminated polydimethylsiloxane, phosphate-branched grafted polydimethylsiloxane, polyether-branched grafted polydimethylsiloxane, 1,3,5,7-octamethylcyclotetrasiloxane, 1,3,5,7-tetrahydro-1,3,5,7-tetramethylcyclotetrasiloxane, cyclopentapolydimethylsiloxane, 2,4,6,8-tetramethylcyclotetrasiloxane, 2,4,6,8-tetramethyl-2,4,6,8-tetravinylcyclotetrasiloxane, cyclic polymethylvinylsiloxane, hexadecamethylcyclooctasiloxane, tetradecamethylcycloheptasiloxane, and cyclic polydimethylsiloxane.

In any embodiment, the number average molecular weights of the polysiloxane, the polysaccharide and the polysaccharide derivative are each independently 300,000 or less, optionally 10,000 to 200,000, more optionally 20,000 to 120,000, and further optionally 400 to 80,000.

In any embodiment, the percentage mass content of polar functional groups in the polysiloxane is α, 0≤α<50%, optionally, 5%≤α≤30%.

In any embodiment, the substituents attached to the sugar units in the polysaccharide and the polysaccharide derivative each independently include one or more of the group consisting of the following functional groups: —OH, —COOH and salts thereof, —R—OH, —$SO_3H$ and salts thereof, —R—OH, —R—$SO_3H$ and salts thereof, sulfate, alkoxy, R represents alkylene, optionally representing C1-C5 alkylene; optionally, the substituents attached to the sugar units in the polysaccharide and the polysaccharide derivative each independently include one or more of the group consisting of the following functional groups: —OH, —COOH, —COOLi, —COONa, —COOK, —$SO_3H$, —$SO_3Li$, —$SO_3Na$, —$SO_3K$, —$CH_2$—$SO_3H$, —$CH_2$—$SO_3Li$, —$CH_2$—$SO_3Na$, —$CH_2$—$SO_3K$, methoxy, and ethoxy.

In any embodiment, the polysaccharide includes one or more selected from pectin, carboxymethyl starch, hydroxypropyl starch, dextrin, cellulose ether, carboxymethyl chitosan, hydroxyethyl cellulose, carboxymethyl cellulose, carboxypropyl methyl cellulose, guar gum, sesbania gum, gum arabic, lithium alginate, sodium alginate, potassium alginate, fucoidan, agar, carrageenan, carrageenin, xanthan gum and fenugreek gum.

In any embodiment, the percentage mass contents of the substituents attached to the sugar units in the polysaccharide and the polysaccharide derivative are each independently 20% to 85%, optionally 30% to 78%.

In any embodiment, the lattice mismatch between the material of the inner core and the material of the shell is less than 10%. This can improve the contact between the inner core and the shell (or cladding layer) to prevent the shell (or cladding layer) from falling off.

In any embodiment, based on the total weight of the first positive electrode active material, the content of manganese is in the range of 10 wt %-35 wt %, optionally in the range of 13.3 wt %-33.2 wt % more optionally in the range of 15 wt %-30 wt %, and further optionally in the range of 17 wt %-20 wt %; and/or, the content of phosphorus is in the range of 12 wt %-25 wt %, optionally in the range of 15 wt %-20 wt %, and more optionally in the range of 16.8 wt %-19.5 wt %; and/or, the weight ratio of manganese to phosphorus is in the range of 0.71-1.85, optionally 0.90-1.25, and more optionally 0.95-1.20.

Limiting the content of manganese within the above range can further improve the stability and density of the first positive electrode active material, thereby improving the battery's cycling performance, storage performance and compacted density, etc.; and can maintain higher voltage plateau, thereby improving the battery's energy density.

Limiting the content of phosphorus within the above range can effectively reduce the influence of small polaron conductivity on the conductivity of the first positive electrode active material, and can further improve the stability of the lattice structure, thereby improving the overall stability of the first positive electrode active material.

Limiting the weight ratio of manganese to phosphorus within the above range can further reduce manganese dissolution, improve the stability and gram capacity of the first positive electrode active material, and improve the cycling performance and storage performance of the battery; it can also reduce impurity phases, enable the first positive electrode active material to maintain higher discharge voltage plateau, and enable the battery to have high energy density.

In any embodiment, the surface of the first positive electrode active material is cladded with one or more of carbon and doped carbon; optionally, the surface of the first positive electrode active material is cladded with carbon. Thus, the conductivity of the first positive electrode active material can be improved.

In any embodiment, the doping element in the doped carbon includes one or more selected from nitrogen, phosphorus, sulfur, boron and fluorine.

In any embodiment, the cladding amount of the shell is 0.1 wt % to 6 wt %, based on the weight of the inner core.

In any embodiment, the cladding amount of the first cladding layer is greater than 0 and less than or equal to 7 wt %, optionally greater than 0 and less than or equal to 6 wt %, more optionally greater than 0 and less than or equal to 5.5 wt % or 4-5.6 wt %, and further optionally greater than 0 and less than or equal to 2 wt %, based on the weight of the inner core; and/or, the cladding amount of the second cladding layer is greater than 0 and less than or equal to 6 wt %, optionally greater than 0 and less than or equal to 5.5 wt %, and more optionally 2-4 wt % or 3-5 wt %, based on the weight of the inner core; and/or, the cladding amount of the third cladding layer is greater than 0 and less than or equal to 6 wt %, optionally greater than 0 and less than or equal to 5.5 wt %, and more optionally greater than 0 and less than or equal to 2 wt %, based on the weight of the inner core.

In any embodiment, the shell further comprises a fourth cladding layer cladding the third cladding layer and a fifth cladding layer cladding the fourth cladding layer; the cladding amounts of the fourth cladding layer and the fifth cladding layer are each independently 0.01 wt % to 10 wt %, optionally 0.05 wt % to 10 wt %, more optionally 0.1 wt % to 5 wt %, further 0.1 wt % to 2 wt %, based on the weight of the inner core.

The cladding amount of the cladding layer is preferably within the above range, which can fully coat the inner core and further improve the kinetic performance of the battery without sacrificing the gram capacity of the first positive electrode active material.

In any embodiment, the shell is located on 40% to 90% of the surface of the inner core, optionally 60% to 80% of the surface. Therefore, the inner core can be fully cladded, thereby improving the kinetic performance of the battery.

In any embodiment, the thickness of the shell is 1-15 nm.

In any embodiment, the thickness of the first cladding layer is 1-10 nm, optionally 2-10 nm; and/or the thickness of the second cladding layer is 2-25 nm, optionally 2-15 nm, more optionally 3-15 nm; and/or the thickness of the third cladding layer is 2-25 nm, optionally 5-25 nm.

In any embodiment, the one or more cladding layers each independently comprise one or more selected from pyrophosphate, phosphate and oxide, and the one or more selected from the pyrophosphate, phosphate and oxide are crystalline; optionally, the crystallinities of the pyrophosphate, the phosphate and the oxide are each independently 10% to 100%, and more optionally 50% to 100%.

Pyrophosphate and phosphate with a certain degree of crystallinity not only promote the full exertion of the ability of the pyrophosphate cladding layer to reduce manganese dissolution and the excellent lithium ion-conducting ability of the phosphate cladding layer to reduce the interfacial side reactions, but also allow for better lattice matching between the pyrophosphate cladding layer and the phosphate cladding layer, thereby enabling tight bonding between the cladding layers.

In any embodiment, in the shell, the weight ratio of pyrophosphate to phosphate and the weight ratio of pyrophosphate to oxide are each independently 1:3 to 3:1, and optionally 1:3 to 1:1. Therefore, by having pyrophosphate and phosphate in a suitable weight ratio range or pyrophosphate and oxide in a suitable weight ratio range, it can effectively reduce manganese dissolution, effectively reduce the surface impurity lithium content, and reduce interfacial side reactions, thereby improving the high-temperature storage performance and high-temperature cycling performance of the battery.

In any embodiment, the one or more cladding layers each independently comprise carbon, and the carbon is a mixture of SP2-form carbon and SP3-form carbon; optionally, the molar ratio of SP2-form carbon to SP3-form carbon in the carbon is any value within the range of 0.07-13, more optionally any value within the range of 0.1-10, and further optionally any value within the range of 2.0-3.0. By selecting the form of carbon in the carbon cladding layer, the overall electrical performance of the secondary battery can be improved.

In any embodiment, the one or more cladding layers each independently comprise doped carbon, and the mass content of the doping element in the doped carbon is 30% or less; optionally, the mass content of the doping element in the doped carbon is 20% or less. The doping elements within the above content range can not only fully improve the conductivity of the pure carbon layer, but also effectively avoid excessive surface activity caused by excessive doping of the doping elements, thereby effectively controlling the interfacial side reactions caused by excessive doping of the cladding layer.

In any embodiment, the one or more cladding layers each independently comprise doped carbon, in the doped carbon, the doping element is nitrogen element and/or sulfur element, and the mass content of the doping element in the doped carbon is 1% to 15%; or, the doping element is phosphorus element, boron element and/or fluorine element, and the mass content of the doping element in the doped carbon is 0.5% to 5%; optionally, the doping element is nitrogen, phosphorus, sulfur, boron or fluorine.

Since nitrogen atoms and sulfur atoms are closer to carbon atoms in terms of atomic radius and are not easy to destroy the carbon skeleton, when the doping amounts of nitrogen atoms and sulfur atoms are within the above relatively wide ranges, the conductivity of the doped carbon layer can be fully exerted, and the lithium ion transport and lithium ion desolvation capabilities can be promoted.

Since the atomic radius of phosphorus atoms, boron atoms and/or fluorine atoms is different from that of carbon atoms and excessive doping can easily destroy the carbon skeleton, when the doping amounts of phosphorus atoms, boron atoms and/or fluorine atoms are within the relatively small ranges mentioned above, the conductivity of the doped carbon layer can be fully exerted, and the lithium ion transport and lithium ion desolvation capabilities can be promoted.

In any embodiment, the one or more cladding layers each independently comprise pyrophosphate, and the pyrophosphate has an interplanar spacing in the range of 0.293-0.470 nm, optionally 0.297-0.462 nm or 0.293-0.326 nm, and more optionally 0.300-0.310 nm, and a crystal direction (111) angle in the range of 18.00°-32.57°, optionally 18.00°-32.00° or 26.41°-32.57°, more optionally 19.211°-30.846°, and further optionally 29.00°-30.00°.

In any embodiment, the one or more cladding layers each independently comprise phosphate, and the phosphate has an interplanar spacing in the range of 0.244-0.425 nm, optionally 0.345-0.358 nm, and a crystal direction (111) angle in the range of 20.00°-37.00°, optionally 24.25°-26.45°.

Thus, the impurity phase in the cladding layer can be effectively avoided, thereby improving the gram capacity, cycling performance and rate performance of the material.

In any embodiment, the first cladding layer or the second cladding layer comprises a phosphate.

In any embodiment, the lattice change rate of the first positive electrode active material before and after complete lithium (de)intercalation is 50% or less, optionally 9.8% or less, more optionally 8.1% or less, further optionally 7.5% or less, still further optionally 6% or less, still further optionally 4% or less, still further optionally 3.8% or less, and still further optionally 2.0-3.8%. By reducing the lattice change rate, Li ion transport can be made easier, that is, the migration ability of Li ions in the first positive electrode active material is stronger, which is beneficial to improving the rate performance of the battery.

In any embodiment, the Li/Mn antisite defect concentration of the first positive electrode active material is 5.3% or less, optionally 5.1% or less, more optionally 4% or less, further optionally 2.2% or less, further optionally 2% or less, still further optionally 1.5%-2.2% or 0.5% or less. By reducing the Li/Mn antisite defect concentration, it helps to improve the gram capacity and rate performance of the first positive electrode active material.

In any embodiment, the surface oxygen valence state of the first positive electrode active material is −1.55 or less, optionally −1.82 or less, more optionally −1.88 or less, further optionally-1.90 or less or −1.98 to −1.88, still further optionally −1.98 to −1.89, and still further optionally −1.98 to −1.90. By reducing the surface oxygen valence state, the interfacial side reactions between the first positive electrode active material and the electrolyte solution can be reduced, thus improving the cycling performance and high-temperature stability of the battery.

In any embodiment, the positive electrode active material composition satisfies $0.0004 \leq w_a \times y \times (3.4-VB) \leq 0.063$, optionally, $0.0015 \leq w_a \times y \times (3.4-V_B) \leq 0.045$, $w_a$ represents the weight content of the first positive electrode active material based on the total weight of the positive electrode active material composition, y is the molar quantity of element B in 1 mol of the compound represented by formula (I), and $V_B$ is the voltage plateau of element B in the compound represented by formula (I), in V (volt). When the positive electrode active material composition further meets the above conditions, it helps the positive electrode plate to have both high compacted density and high compacted density efficiency, and helps the battery to have both high energy density and long service life.

In any embodiment, the second positive electrode active material comprises layered oxide. By reasonably combining the first positive electrode active material with the second positive electrode active material, it can improve the actual stacking density of the positive electrode active material composition, improve the compacted density and compacted density efficiency of the positive electrode plate, and thereby enabling the battery using the positive electrode active material composition to have higher energy density and longer service life.

In any embodiment, the second positive electrode active material comprises a compound represented by formula (II), $$Li_{a1}A^1_{b1}Ni_{c1}Co_{d1}B^1_{e1}C^1_{f1}O_{2-g1}D^1_{g1}, \quad (II)$$

$A^1$ includes one or more elements selected from group IA, group IIA, group VIII, group VIB, and group IIB; $B^1$ includes Mn and/or Al; $C^1$ includes one or more elements selected from group IA, group IIA, group IIIA, group IVA, VA, group VIA, group IIB, group IIIB, group IVB, group VB, group VIB and group VIII; $D^1$ includes one or more elements selected from group VIA and group VIIA; a1 is selected from the range of 0.8 to 1.2; b1 is selected from the range of 0 to 0.2; c1 is selected from the range of 0 to 1; d1 is selected from the range of 0 to 1; e1 is selected from the range of 0 to 1; f1 is selected from the range of 0 to 0.1; g1 is selected from the range of 0 to 0.1; and c1+d1+e1+f1=1.

In any embodiment, $A^1$ includes one or more elements selected from Na, K, Mg, Rb, Zn and Zr.

In any embodiment, $C^1$ includes one or more elements selected from Al, Mg, Ca, Na, Ti, W, Zr, Sr, Cr, Fe, Zn, Ba, Mo, V, Ce, Nb, Sb, Ta, Ge, Nb, Sc, Ba, B, S and Y, and optionally includes one or more elements selected from Al, Ti, Zr, Nb, Sr, Sc, Sb, Y, Ba and B.

In any embodiment, $D^1$ includes one or more elements selected from N, S, F, Cl and Br, and optionally includes S and/or F.

In any embodiment, a1 is selected from the range of 0.9 to 1.1.

In any embodiment, b1 is selected from the range of 0 to 0.1.

In any embodiment, c1 is selected from the range of 0.314 to 0.990, and optionally from the range of 0.500 to 0.990.

In any embodiment, d1 is selected from the range of 0 to 0.320, and optionally from the range of 0 to 0.150.

In any embodiment, e1 is selected from the range of 0.001 to 0.450, and optionally from the range of 0.005 to 0.4.

In any embodiment, f1 is selected from the range of 0.001 to 0.1, and optionally from the range of 0.001 to 0.05.

In any embodiment, g1 is selected from the range of 0 to 0.01, and optionally from the range of 0.01 to 0.05.

In any embodiment, the second positive electrode active material comprises an inner core and a shell cladding the inner core, the inner core comprises the compound represented by formula (II); the shell comprises one or more cladding layers; and each cladding layer has ionic conductivity and/or electronic conductivity.

In any embodiment, in the shell of the second positive electrode active material, the one or more cladding layers each independently comprise one or more selected from phosphate, pyrophosphate, carbon, doped carbon, oxide, and fast ion conductor, and optionally comprise one or more selected from phosphate, pyrophosphate, and oxide.

In any embodiment, the shell of the second positive electrode active material comprises a cladding layer; optionally, the cladding layer comprises one or more selected from phosphate, pyrophosphate, and oxide.

In any embodiment, the shell of the second positive electrode active material comprises a first cladding layer cladding the inner core and a second cladding layer cladding the first cladding layer; optionally, the first cladding layer and the second cladding layer each independently comprise one or more selected from phosphate, pyrophosphate, and oxide; more optionally, the first cladding layer comprises one or more selected from phosphate and oxide, and the second cladding layer comprises one or more selected from pyrophosphate and oxide.

In any embodiment, the cladding amount of the shell of the second positive electrode active material is 0.005 wt % to 1 wt %, optionally 0.01 wt % to 0.5 wt %, based on the weight of the inner core; and/or the thickness of the shell is 2 nm to 200 nm, optionally 5 nm to 50 nm.

A second aspect of the present application provides a positive electrode plate comprising a positive electrode current collector and a positive electrode film layer provided on at least one surface of the positive electrode current collector, the positive electrode film layer comprises a positive electrode active material, and the positive electrode active material comprises the positive electrode active material composition according to the first aspect of the present application.

In any embodiment, the content of the positive electrode active material composition in the positive electrode film layer is 90 wt % to 99.5 wt %, and more optionally 95 wt % to 99.5 wt %, based on the total weight of the positive electrode film layer.

In any embodiment, the positive electrode film layer further comprises a third positive electrode active material, the third positive electrode active material includes one or more of lithium-rich oxide materials, lithium iron phosphate materials, spinel lithium manganate materials, and their respective modified compounds, and the modification method includes doping and/or surface cladding modification.

In any embodiment, the third positive electrode active material comprises a compound represented by formula (III), $$Li_{1+p1}A^2_{q1}B^2_{r1}O_{s1,} \tag{III}$$

$0.05 \le p1 < 0.2$, $0.10 < q1 \le 0.95$, $0 \le r1 \le 0.2$, and $2 \le s1 < 3$, $A^2$ includes one or more elements selected from Co, Ni, Mn and Al; $B^2$ includes one or more elements selected from Mg, Ti, Cr, Zr, Nb, Fe, Mo, Cu, Sb, V, P and F.

In any embodiment, the third positive electrode active material comprises an inner core and a shell cladding the inner core, the inner core comprises the compound represented by formula (III); the shell comprises one or more cladding layers; and each cladding layer has ionic conductivity and/or electronic conductivity.

In any embodiment, the one or more cladding layers in the shell cladding the compound represented by formula (III) independently include one or more materials selected from phosphate, pyrophosphate, solid electrolyte, conductive polymer, and materials capable of reversibly (de)intercalating lithium ions.

In any embodiment, the cladding amount of the shell cladding the compound represented by formula (III) is 0.1 wt % to 5 wt %, and optionally 0.5 wt % to 2 wt %, based on the weight of the inner core; and/or the thickness of the shell cladding the compound represented by formula (III) is 2 nm to 200 nm, and optionally 5 nm to 50 nm.

In any embodiment, the third positive electrode active material comprises a compound represented by formula (IV), $$Li_{a2}A^3_{x2}B^3_{y2}P_{1-z2}C^3_{z2}O_{4-n2}D^3_{n2}, \tag{IV}$$

$A^3$ includes one or more elements selected from group IA, group IIA, group IIIA, group IIB, group VB and group VIB; $B^3$ includes one or more elements selected from group IA, group IIA, group IIIA, group IVA, group VA, group IIB, group IVB, group VB, group VIB and group VIII; $C^3$ includes one or more elements selected from group IIIA, group IVA, group VA and group VIA; $D^3$ includes one or more elements selected from group VIA and group VIIA; a2 is selected from the range of 0.85 to 1.15; x2 is selected from the range of 0 to 0.1; y2 is selected from the range of 0.001 to 0.999; z2 is selected from the range of 0 to 0.5; and n2 is selected from the range of 0 to 0.5.

In any embodiment, $A^3$ includes one or more elements selected from Rb, Cs, Be, Ca, Sr, Ba, Ga, In, Cd, V, Ta, Cr, Zn, Al, Na, K, Mg, Nb, Mo and W, and optionally includes one or more elements selected from Zn, Al, Na, K, Mg, Nb, Mo and W.

In any embodiment, $B^3$ includes one or more elements selected from Rb, Cs, Be, Ca, Sr, Ba, In, Pb, Bi, Cd, Hf, Ta, Cr, Ru, Rh, Pd, Os, Ir, Pt, Zn, Al, Na, K, Mg, Mo, W, Ti, V, Zr, Fe, Ni, Co, Ga, Sn, Sb, Nb and Ge, and optionally includes one or more elements selected from Zn, Al, Na, K, Mg, Mo, W, Ti, V, Zr, Fe, Ni, Co, Ga, Sn, Sb, Nb and Ge.

In any embodiment, $C^3$ includes one or more elements selected from B (boron), S, Si and N.

In any embodiment, $D^3$ includes one or more elements selected from S, F, Cl and Br.

In any embodiment, a2 is selected from the range of 0.9 to 1.1, and optionally from the range of 0.97 to 1.01.

In any embodiment, x2 is selected from the range of 0.001 to 0.005.

In any embodiment, y2 is selected from the range of 0.001 to 0.5, optionally from the range of 0.01 to 0.5, and optionally from the range of 0.25 to 0.5.

In any embodiment, z2 is selected from the range of 0.001 to 0.5, optionally from the range of 0.001 to 0.1, and more optionally from the range of 0.001 to 0.005.

In any embodiment, n2 is selected from the range of 0 to 0.1, and optionally from the range of 0.001 to 0.005.

In any embodiment, the third positive electrode active material comprises an inner core and a shell cladding the inner core, the inner core comprises the compound represented by formula (IV); and the shell is the same as the shell cladding the compound represented by formula (I).

In any embodiment, the third positive electrode active material comprises a compound represented by formula (V), $$LiMn_{t1}A^4_{2-t1}O_4, \tag{V}$$

t1 is selected from the range of 0 to 2, and $A^4$ includes one or more elements selected from Ni, Cr, Al, Zr, V, Ti, Mo, Ru, Mg, Nb, Ba, Si, P, W, Co, Cu and Zn.

In any embodiment, the third positive electrode active material comprises an inner core and a shell cladding the inner core, the inner core comprises the compound represented by formula (V); the shell comprises one or more cladding layers; and each cladding layer has ionic conductivity and/or electronic conductivity.

In any embodiment, the one or more cladding layers in the shell cladding the compound represented by formula (V) each independently include one or more materials selected from phosphate, pyrophosphate, solid electrolyte, conductive polymer, and materials capable of reversibly (de)intercalating lithium ions.

In any embodiment, the cladding amount of the shell cladding the compound represented by formula (V) is 0.1 wt % to 5 wt %, and optionally 0.5 wt % to 2 wt %, based on the weight of the inner core; and/or the thickness of the shell cladding the compound represented by formula (V) is 2 nm to 200 nm, and optionally 5 nm to 50 nm.

In any embodiment, the positive electrode film layer comprises a positive electrode binder and/or a positive electrode conductive agent.

In any embodiment, the positive electrode binder includes a vinylidene fluoride homopolymer and/or copolymer, and more optionally, the comonomer includes one or more of tetrafluoroethylene, hexafluoropropylene, and propylene.

In any embodiment, the weight average molecular weight of the positive electrode binder is 300,000 to 2,000,000.

In any embodiment, the positive electrode film layer further comprises functional additives, and the functional additives include one or more of dispersants, plasticizers, pore-forming agents, water removal additives, acid removal additives, and lithium supplements.

In any embodiment, the positive electrode plate further comprises a functional coating, the functional coating is located between the positive electrode current collector and the positive electrode film layer and/or on the surface of the positive electrode film layer facing away from the positive electrode current collector, and the functional coating comprises one or more of conductive carbon, water removal additives, acid removal additives, and lithium supplements.

A third aspect of the present application provides a battery comprising the positive electrode active material composition of the first aspect or the positive electrode plate of the second aspect of the present application.

In any embodiment, the battery comprises an electrolyte, and the electrolyte includes one or more of a liquid electrolyte, an all-solid electrolyte, and a gel electrolyte.

In any embodiment, the liquid electrolyte comprises a lithium salt, a non-aqueous solvent for dissolving the lithium salt, and optional additives; optionally, the lithium salt includes one or more selected from $LiPF_6$, $LiBF_4$, $LiN(SO_2F)_2$, $LiN(CF_3SO_2)_2$, $LiClO_4$, $LiAsF_6$, $LiB(C_2O_4)_2$, $LiBF_2C_2O_4$ and $LiPO_2F_2$.

In any embodiment, the concentration of the lithium salt is 0.5-1.5 mol/L.

In any embodiment, the non-aqueous solvent includes one or more selected from propylene carbonate, ethylene carbonate, butene carbonate, dimethyl carbonate, diethyl carbonate, dipropyl carbonate, ethyl methyl carbonate, methyl propyl carbonate, ethyl propyl carbonate, methyl formate, ethyl acetate, methyl butyrate, ethyl butyrate, methyl propionate, ethyl propionate, propyl propionate, methyl acrylate, ethylene sulfite, propylene sulfite, dimethyl sulfite, diethyl sulfite, anhydride, N-methylpyrrolidone, acetonitrile, sulfolane, dimethyl sulfoxide, dimethyl sulfide, y-butyrolactone, and tetrahydrofuran.

In any embodiment, the additive includes one or more selected from cyclic carbonate compounds containing carbon-carbon double bonds, halogen-substituted cyclic carbonate compounds, nitrile and polynitrile compounds, phosphazene compounds, aromatic hydrocarbons and halogenated aromatic hydrocarbon compounds, isocyanate compounds, acid anhydride compounds, sulfate compounds, sulfite compounds, sulfonate compounds, disulfonate compounds, borate compounds, phosphate compounds, amide compounds, carbodiimide compounds, crown ethers and azacrown ether compounds, and their respective derivatives, optionally including vinylene carbonate, 1,2,3-tris(2-cyanoethoxy)propane, 1-aza-12-crown 4-ether, N,N'-dicyclohexylcarbodiimide, N,N'-diisopropylcarbodiimide, N,N-dimethylformamide, N,N-diethylformamide, N,N-dimethylacetamide, tris(hexafluoroisopropyl) borate, tris(2,2,3,3-tetrafluoropropyl) borate, and tris(pentafluorophenyl) borate.

In any embodiment, the battery comprises a negative electrode plate, the negative electrode plate comprises a negative electrode current collector and negative electrode film layer provided on at least one surface of the negative electrode current collector; the negative electrode film layer comprises a negative electrode active material, and the negative electrode active material includes one or more of carbon-based materials, silicon-based materials, tin-based materials and lithium titanate; optionally, the negative electrode active material includes carbon-based materials, or a combination of carbon-based materials and silicon-based materials.

In any embodiment, the porosity of the negative electrode film layer is 20% to 50%.

In any embodiment, the negative electrode active material includes a carbon-based material, and the carbon-based material includes graphite, or a combination of graphite and hard carbon.

In any embodiment, the negative electrode active material includes a combination of a carbon-based material and a silicon-based material, the carbon-based material includes graphite, or a combination of graphite and hard carbon, and the content of the silicon element in the negative electrode active material is greater than 0 and less than or equal to 30 wt %, based on the total weight of the negative electrode active material.

In any embodiment, the negative electrode plate further comprises a functional coating, the functional coating is located between the negative electrode current collector and the negative electrode film layer and/or on the surface of the negative electrode film layer facing away from the negative electrode current collector; optionally, the functional coating comprises carbon.

In any embodiment, the negative electrode film layer further comprises a lithium-supplementing material. Optionally, the lithium-supplementing material includes one or more of lithium foil, lithium ribbon, lithium powder, and pre-lithiation agent. Optionally, the pre-lithiation agent includes one or more of Li-aromatic hydrocarbons, complexes of Li-aromatic hydrocarbons and ether solvents, and further optionally includes one or more of naphthalene lithium and biphenyl lithium-dimethyl ether.

In any embodiment, the negative electrode plate comprises a negative electrode current collector and a first negative electrode film layer and a second negative electrode film layer respectively provided on two surfaces of the negative electrode current collector, and optionally, the thickness ratio of the first negative electrode film layer to the second negative electrode film layer is 5:95 to 95:5.

In any embodiment, the battery comprises a negative electrode plate, and the negative electrode plate does not comprise a negative electrode active material capable of (de)intercalating lithium ions.

In any embodiment, the negative electrode plate comprises a lithium sheet or a lithium alloy sheet.

In any embodiment, the negative electrode plate comprises a mesh or foam-like three-dimensional skeleton layer.

In any embodiment, the battery comprises a separator, and the separator comprises a porous substrate.

In any embodiment, the separator further comprises a coating located on at least one surface of the porous substrate, and optionally, the coating comprises one or more of inorganic heat-resistant particles and organic heat-resistant particles.

In any embodiment, the porosity of the separator is in a range of 10%-40%.

A fourth aspect of the present application provides an electrical apparatus comprising the battery according to the third aspect of the present application.

The electrical apparatus of the present application comprises the battery provided by the present application, so it has at least the same advantages as the battery.

DESCRIPTION OF DRAWINGS

To more clearly illustrate the technical solutions of embodiments of the present application, the following provides a brief description of the accompanying drawings used in the embodiments of the present application. It is evident that the accompanying drawings described below are only some embodiments of the present application. For those of ordinary skill in the art, other accompanying drawings can also be obtained based on the drawings without any creative effort.

Figure 1:
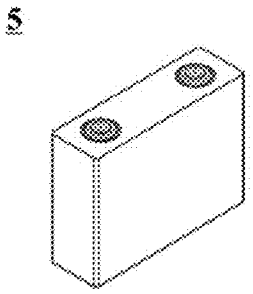
FIG. 1 is a schematic view of an embodiment of a battery cell of the present application.

The accompanying drawings may not be drawn according to an actual scale. Description of reference numerals: 1 Battery pack, 2 Upper box, 3 Lower box, 4 Battery module, 5 Battery cell, 51 Case, 52 Electrode assembly, and 53 Cover plate.

DETAILED DESCRIPTION

The following is to make appropriate reference to the accompanying drawings to describe in detail the embodiments of the positive electrode active material composition, positive electrode plate, battery and electrical apparatus of the present application. However, there may be cases where unnecessary detailed descriptions are omitted. For example, there are cases where detailed descriptions of well-known items and repeated descriptions of actually identical structures are omitted. This is to avoid unnecessary redundancy in the following descriptions and to facilitate understanding by those skilled in the art. In addition, the drawings and subsequent descriptions are provided for those skilled in the art to fully understand the present application, and are not intended to limit the subject matter recited in the claims.

"Ranges" disclosed in the present application are defined in the form of lower limits and upper limits, a given range is defined by the selection of a lower limit and an upper limit, and the selected lower limit and upper limit define boundaries of a particular range. A range defined in this manner may be inclusive or exclusive of end values, and may be arbitrarily combined, that is, any lower limit may be combined with any upper limit to form a range. For example, if the ranges of 60-120 and 80-110 are listed for a particular parameter, it is understood that the ranges of 60-110 and 80-120 are also contemplated. Additionally, if the minimum range values 1 and 2 are listed, and if the maximum range values 3, 4 and 5 are listed, the following ranges are all contemplated: 1-3, 1-4, 1-5, 2-3, 2-4 and 2-5. In the present application, unless stated otherwise, the numerical range "a-b" represents an abbreviated representation of any combination of real numbers between a to b, where both a and b are real numbers. For example, the numerical range "0-5" means that all the real numbers between "0-5" have been listed herein, and "0-5" is just an abbreviated representation of combinations of these numerical values. In addition, when a parameter is expressed as an integer greater than or equal to 2, it is equivalent to disclosing that the parameter is, for example, an integer of 2, 3, 4, 5, 6, 7, 8, 9, 10, 11, 12, and the like.

Unless otherwise specifically stated, all embodiments and optional embodiments of the present application may be combined with each other to form new technical solutions, and such technical solutions should be considered as being included in the disclosure of the present application.

Unless otherwise specifically stated, all technical features and optional technical features of the present application may be combined with each other to form new technical solutions, and such technical solutions should be considered as being included in the disclosure of the present application.

Unless otherwise specifically stated, all steps in the present application may be performed sequentially or randomly, and are preferably performed sequentially. For example, the method includes steps (a) and (b), indicating that the method may include steps (a) and (b) performed sequentially, or may include steps (b) and (a) performed sequentially. For example, the reference to the method may further comprise step (c), meaning that step (c) may be added to the method in any order, for example, the method may comprise steps (a), (b) and (c), or may comprise steps (a), (c) and (b), or may comprise steps (c), (a) and (b), and so on.

Unless otherwise specifically stated, the "including" and "comprising" mentioned in the present application mean open-ended, or may be closed-ended. For example, the terms "including" and "comprising" may indicate that other components not listed may be further included or comprised, or only the listed components may be included or comprised.

Unless otherwise specifically stated, in the present application, the term "or" is inclusive. For example, the phrase "A or B" means "A, B, or both A and B." More specifically, the condition "A or B" is satisfied under any one of the following conditions: A is true (or present) and B is false (or absent); A is false (or absent) and B is true (or present); or both A and B are true (or present).

Unless otherwise particularly stated, in the present application, the terms "first", "second", "third", "fourth", "fifth" and the like are used to distinguish different objects, not to describe a particular sequence or primary-secondary relationship.

In the present application, the terms "a plurality of" and "multiple" refer to two or more.

Throughout the specification, the substituents of the compounds are disclosed in groups or ranges. It is expressly contemplated that such descriptions include each individual sub-combination of members of these groups and ranges. For example, the term "C1-C6 alkyl" is expressly intended to disclose individually C1, C2, C3, C4, C5, C6, C1-C6, C1-C5, C1-C4, C1-C3, C1-C2, C2-C6, C2-C5, C2-C4, C2-C3, C3-C6, C3-C5, C3-C4, C4-C6, C4-C5, and C5-C6 alkyl.

Unless otherwise specified, the terms used in the present application have well-known meanings as commonly understood by those skilled in the art.

Unless otherwise stated, numerical values of parameters mentioned in the present application may be measured using various testing methods commonly used in the art. For example, the numerical values may be measured according to testing methods given in the examples of the present application. Unless otherwise stated, all parameters are tested at 25° C.

Unless otherwise specified, all ratio parameters involved in the present application are compared in the same unit. For example, the ratio of volume distribution particle size of A to B is 1:1, and the units of the volume distribution particle sizes of A and B are the same.

In the present application, the term "compacted density efficiency" refers to the ratio of the compacted density of the film layer to the theoretical compacted density of the active material powder.

In the present application, the first positive electrode active material, the second positive electrode active material, and the third positive electrode active material may be tested for element content using inductively coupled plasma emission spectroscopy (ICP).

The battery mentioned in the embodiments of the present application is a single physical module including one or more battery cells to provide higher voltage and capacity. For example, the battery mentioned in the present application may include a battery cell, a battery module or a battery pack.

The battery cell is the smallest unit that makes up a battery, which is capable of achieving the charging and discharging functions alone. The battery cell may be in a cylindrical shape, a flat shape, a cuboid shape or another shape, which is not limited in the embodiments of the present application. For example, FIG. 1 is a battery cell 5 in a cuboid structure as an example.

When there are a plurality of battery cells, the plurality of battery cells are connected by series connection, or parallel connection, or parallel-series connection through a bus component. In some embodiments, the battery may be a battery module; when there are a plurality of battery cells, the plurality of battery cells are arranged and fixed to form a battery module. In some embodiments, the battery may be a battery pack. The battery pack includes a box and a battery cell. The battery cell or the battery module is accommodated in the box. In some embodiments, the box may be a part of a vehicle chassis structure. For example, a part of the box may become at least a part of a vehicle floor, or a part of the box may become at least a part of a cross beam and a longitudinal beam of a vehicle.

In some embodiments, the battery may be an energy storage apparatus. The energy storage device includes an energy storage container, an energy storage electric cabinet, etc.

The battery cells mentioned in the embodiments of the present application include lithium ion primary battery cells, lithium ion secondary battery cells, lithium metal battery cells, negative electrode-free lithium metal battery cells, etc., which is not limited in the embodiments of the present application.

The battery cell generally comprises an electrode assembly. The electrode assembly generally comprises a positive electrode plate, a negative electrode plate, and a separator between the positive electrode plate and the negative electrode plate. The electrode assembly may be a wound structure or a stacked structure, which is not limited in the embodiments of the present application.

The battery cell may further comprise an outer package which may be used to encapsulate the aforementioned electrode assembly and electrolyte solution. The outer package may be a hard case, such as a hard plastic case, an aluminum case, or a steel case. The outer package can also be a soft package, such as a pouch-type soft package. The material of the soft package may be plastic, such as one or more of polypropylene (PP), polybutylene terephthalate (PBT), and polybutylene succinate (PBS).

Figure 2:
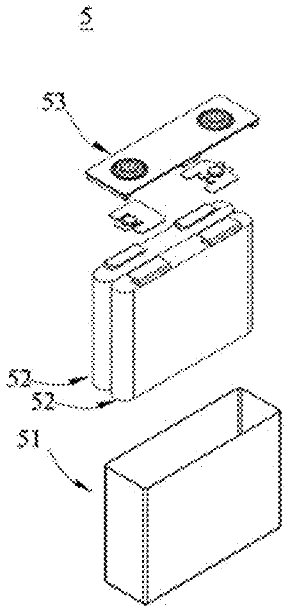
FIG. 2 is a schematic exploded view of an embodiment of a battery cell according to the present application.

In some embodiments, as shown in FIG. 2, the outer package may include a case 51 and a cover plate 53. The case 51 may include a bottom plate and side plates connected to the bottom plate, which define an accommodating cavity. The case 51 has an opening in communication with the accommodating cavity, and the cover plate 53 is configured to cover an opening to close the accommodating cavity. The electrode assembly 52 is encapsulated in the accommodating cavity. The number of the electrode assembly 52 comprised in the battery cell 5 can be one or more, and can be adjusted according to requirements.

Figure 3:
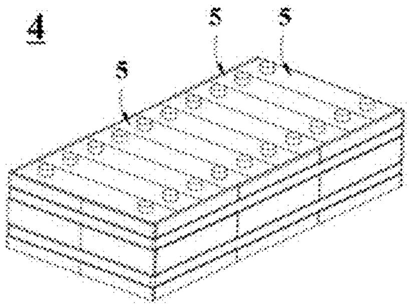
FIG. 3 is a schematic view of an embodiment of a battery module of the present application.

In some embodiments, the battery cell can be assembled into a battery module, the number of battery cells included in the battery module can be multiple, and the specific number may be adjusted according to the application and capacity of the battery module. FIG. 3 is a schematic view of a battery module 4 as an example. As shown in FIG. 3, in the battery module 4, a plurality of battery cells 5 can be sequentially arranged in a length direction of the battery module 4. Of course, any other arrangements are also possible. The plurality of battery cells 5 may further be fixed by fasteners.

Optionally, the battery module 4 may further include a shell having an accommodating space, and the plurality of battery cells 5 are accommodated in the accommodating space.

In some embodiments, the aforementioned battery modules may further be assembled into the battery pack, and the number of battery modules included in the battery pack may be adjusted according to the application and capacity of the battery pack.

Figure 4:
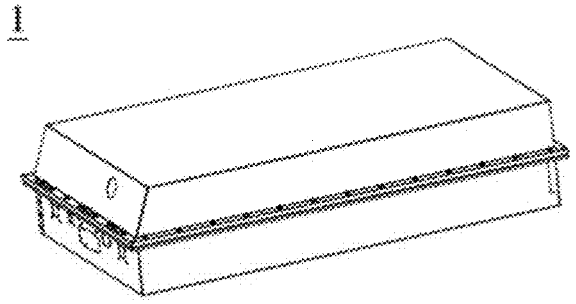
FIG. 4 is a schematic view of an embodiment of a battery pack of the present application.
Figure 5:
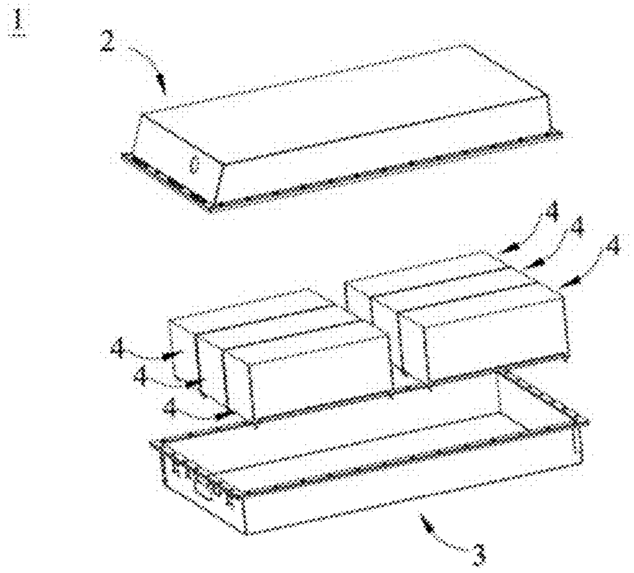
FIG. 5 is a schematic exploded view of the embodiment of the battery pack as shown in FIG. 4.

FIG. 4 and FIG. 5 are schematic views of a battery pack 1 as an example. As shown in FIG. 4 and FIG. 5, the battery pack 1 may include a box and a plurality of battery modules 4 provided in the box. The box includes an upper box 2 and a lower box 3, where the upper box 2 is configured to cover the lower box 3 to form an enclosed space for accommodating the battery modules 4. The plurality of battery modules 4 may be arranged in the box in any manner.

The positive electrode plate comprises a positive electrode active material. As an important component of the battery, the performance of the positive electrode active material is an important factor restricting the battery's energy density and service life. At present, there is no positive electrode active material that can simultaneously meet the requirements of low costs, high capacity and few side reactions.

In view of this, the inventors propose a positive electrode active material composition, which can make the battery have high energy density, low costs and good service life at the same time.

The positive electrode active material composition provided in the embodiments of the present application comprises a first positive electrode active material and a second positive electrode active material having a crystal form different from that of the first positive electrode active material, and the first positive electrode active material includes phosphate. The different crystal forms of the first positive electrode active material and the second positive electrode active material mean that the first positive electrode active material and the second positive electrode active material have different crystal systems.

The particle size distribution curve of the positive electrode active material composition has at least two volume distribution peaks, the volume distribution peak with the maximal peak intensity is marked as the first peak, and the volume distribution particle size corresponding to the maximal peak intensity of the first peak is marked as Dv1, the volume distribution peak with the submaximal peak intensity is marked as the second peak, and the volume distribution particle size corresponding to the maximal peak intensity of the second peak is marked as Dv2, with $0<|Dv1-Dv2|/Dv1\leq 50$. "| |" indicates an absolute value.

The first positive electrode active material includes phosphate, which is usually in an olivine structure and has generally low production costs. However, the compacted density of the first positive electrode active material is relatively small, and it is difficult to meet the requirements for use in high energy density batteries. Using it in combination with another positive electrode active material with high compacted density can improve the compacted density of the positive electrode plate. However, simply mixing the two positive electrode active materials usually does not improve the compacted density and compacted density efficiency of the positive electrode plate, making it difficult to fully utilize the capacity of the battery and also affecting the battery's service life.

The inventors have studied and found that by making the positive electrode active material composition comprise a first positive electrode active material and a second positive electrode active material with different crystal forms, and making the particle size distribution curve of the positive electrode active material composition satisfy $0<|Dv1-Dv2|/Dv1\leq 50$, the first positive electrode active material and the second positive electrode active material can be densely stacked, thereby improving the actual stacking density of the positive electrode active material composition, improving the compacted density and compacted density efficiency of the positive electrode plate, and further enabling the battery using the positive electrode active material composition to have higher energy density and longer service life.

The particle size distribution curve of the positive electrode active material composition can be adjusted by adjusting one or more parameters of the volume distribution particle size, volume particle size distribution width, mass content, etc. of each of the first positive electrode active material and the second positive electrode active material.

In some embodiments, the volume distribution particle size Dv50 of the first positive electrode active material is 0.25 μm to 12.5 μm.

In some embodiments, the volume distribution particle size Dv50 of the second positive electrode active material is 2.5 μm to 16.5 μm.

In some embodiments, the volume distribution particle size Dv50 of the first positive electrode active material is 0.25 μm to 3.5 μm, and the particle size distribution curve of the positive electrode active material composition satisfies:

c. $\leq|Dv1-Dv2|/Dv1\leq 50$, optionally, $0.46\leq|Dv1-Dv2|/Dv1\leq 39.6$; and/or,
   $0.3\ \mu m\leq Dv1\leq 17.8\ \mu m$, optionally, $0.35\ \mu m\leq Dv1\leq 12.1\ \mu m$; and/or,
   $0.3\ \mu m\leq Dv2\leq 17.8\ \mu m$, optionally, $0.46\ \mu m\leq Dv2\leq 14.2\ \mu m$.

This allows the first positive electrode active material and the second positive electrode active material to be stacked more densely, further improving the actual stacking density of the positive electrode active material composition, improving the compacted density and compacted density efficiency of the positive electrode plate, and thereby enabling the battery using the positive electrode active material composition to have higher energy density and/or longer service life.

In some embodiments, the volume distribution particle size Dv50 of the first positive electrode active material is 3.5 μm to 12.5 μm, and the particle size distribution curve of the positive electrode active material composition satisfies:

d. $\leq|Dv1-Dv2|/Dv1\leq 6.0$, optionally, $0.34\leq|Dv1-Dv2|/Dv1\leq 3.8$; and/or,
   $2.0\ \mu m\leq Dv1\leq 12.5\ \mu m$, optionally, $3.0\ \mu m\leq Dv1\leq 12.3\ \mu m$; and/or,
   $2.0\ \mu m\leq Dv2\leq 15.0\ \mu m$, optionally, $3.4\ \mu m\leq Dv2\leq 14.3\ \mu m$.

This allows the first positive electrode active material and the second positive electrode active material to be stacked more densely, further improving the actual stacking density of the positive electrode active material composition, improving the compacted density and compacted density efficiency of the positive electrode plate, and thereby enabling the battery using the positive electrode active material composition to have higher energy density and/or longer service life.

In some embodiments, the morphology of the first positive electrode active material includes one or more of monocrystals and polycrystals, and the morphology of the second positive electrode active material includes one or more of monocrystals and polycrystals.

The term "monocrystal" further comprises quasi-monocrystal (also known as monocrystal-like), which generally refer to particles formed by the aggregation of a small number of primary particles. Polycrystal refers to secondary particles formed by the aggregation of multiple primary particles.

In some embodiments, the volume distribution particle size Dv50 of the first positive electrode active material with a monocrystalline morphology is 0.25 μm to 3.5 μm, and optionally 0.35 μm to 2.5 μm.

In some embodiments, the volume distribution particle size Dv10 of the first positive electrode active material with a monocrystalline morphology is 0.05 μm to 1.5 μm, and optionally 0.1 μm to 1.0 μm.

In some embodiments, the volume distribution particle size Dv50 of the first positive electrode active material with a polycrystalline morphology is 3.5 μm to 12.5 μm, and optionally 3.8 μm to 10.5 μm.

In some embodiments, the volume distribution particle size Dv10 of the first positive electrode active material with a polycrystalline morphology is 0.1 μm to 5.0 μm, and optionally 0.5 μm to 4.5 μm.

In some embodiments, the volume distribution particle size Dv50 of the second positive electrode active material with a monocrystalline morphology is 2.5 μm to 16.5 μm, and optionally 3.0 μm to 8.5 μm.

In some embodiments, the volume distribution particle size Dv10 of the second positive electrode active material with a monocrystalline morphology is 0.3 μm to 8 μm, and optionally 1.0 μm to 3.5 μm.

In some embodiments, the volume distribution particle size Dv50 of the second positive electrode active material with a polycrystalline morphology is 2.5 μm to 16.5 μm, and optionally 3.0 μm to 15.5 μm.

In some embodiments, the volume distribution particle size Dv10 of the second positive electrode active material with a polycrystalline morphology is 0.5 μm to 12 μm, and optionally 1.0 μm to 8.5 μm.

When the volume distribution particle size of the first positive electrode active material and/or the second positive electrode active material is within the above range, it can make the battery have higher energy density, reduce side reactions, lower interface impedance, and thus make the battery have longer service life.

In some embodiments, the morphology of the first positive electrode active material includes monocrystals. For example, the monocrystals may account for more than 80% or more than 90%. The first positive electrode active material with a polycrystalline morphology has a higher specific surface area, which will lead to increased hygroscopicity and increased process time costs during the production process, thereby increasing the production costs of the battery.

In some embodiments, the morphology of the second positive electrode active material includes polycrystals. For example, the polycrystals may account for more than 80% or more than 90%. The second positive electrode active material with a polycrystalline morphology can have larger particle size and higher powder compacted density, thereby helping to improve the energy density of the battery.

In some embodiments, based on the total weight of the positive electrode active material composition, the weight content of the first positive electrode active material is marked as $w_a$, and $w_a$ is selected from the range of 0.5% to 99.5%, and optionally from the range of 2% to 95%.

In some embodiments, based on the total weight of the positive electrode active material composition, the weight content of the second positive electrode active material is marked as $w_b$, and $w_b$ is selected from the range of 0.5% to 99.5%, and optionally from the range of 5% to 98%.

When the content of the first positive electrode active material and/or the second positive electrode active material is within the above range, the battery can have higher energy density and/or longer service life.

In some embodiments, the powder compacted density $P_1$ of the first positive electrode active material at 30000N is 1.89 g/cm$^3$ or more, optionally 1.95 g/cm$^3$ or more, more optionally 1.98 g/cm$^3$ or more, further optionally 2.0 g/cm$^3$ or more, still further optionally 2.2 g/cm$^3$ or more, still further optionally 2.2 g/cm$^3$ or more and 2.8 g/cm$^3$ or less, or 2.2 g/cm$^3$ or more and 2.65 g/cm$^3$ or less.

In some embodiments, the powder compacted density $P_2$ of the second positive electrode active material at 30000N is greater than or equal to 2.90 g/cm$^3$, optionally greater than or equal to 3.1 g/cm$^3$, and more optionally greater than or equal to 3.3 g/cm$^3$.

When the powder compacted density of the first positive electrode active material and/or the second positive electrode active material is within the above range, the battery can have higher energy density.

In some embodiments, the BET specific surface area of the second positive electrode active material is less than or equal to 1.73 m$^2$/g, optionally less than or equal to 1.5 m$^2$/g, and more optionally 0.28 m$^2$/g to 1.5 m$^2$/g. This can reduce side reactions and improve the battery's cycling performance.

The specific surface area of materials has a meaning well known in the art, and can be determined by instruments and methods known in the art. For example, it can be tested using the nitrogen adsorption specific surface area analysis test method with reference to GB/T 19587-2017, and calculated using the BET (Brunauer Emmett Teller) method. The testing instrument can be a Tri-Star 3020 specific surface area and aperture analysis tester of Micromeritics in the United States.

The powder compacted density of the material (e.g., the first positive electrode active material, the second positive electrode active material) can be measured according to GB/T 24533-2009.

The volume distribution particle sizes Dv10 and Dv50 of materials (such as the first positive electrode active material and the second positive electrode active material) have meanings well known in the art, which respectively represent the corresponding particle sizes when the cumulative volume distribution percentage of materials reaches 10% and 50%, and can be determined by instruments and methods known in the art. For example, it can be tested with reference to GB/T 19077-2016 using a laser particle size analyzer. The test instrument can be a Mastersizer 3000 laser particle size analyzer from Malvern Instruments Ltd., UK. Deionized water can be used as the solvent during the test, and the material can be ultrasonically treated for 5 min before the test.

The particle size distribution curve of the positive electrode active material composition can be measured with reference to GB/T 19077-2016 using a laser particle size analyzer. The test instrument can be a Mastersizer 3000 laser particle size analyzer from Malvern Instruments Ltd., UK. Deionized water can be used as the solvent during the test, and the material can be ultrasonically treated for 5 min before the test.

In some embodiments, the first positive electrode active material includes a compound represented by formula (I), $$Li_aA_xMn_{1-y}B_yP_{1-z}C_zO_{4-n}D_n \quad (I)$$

A includes one or more elements selected from group IA, group IIA, group IIIA, group IIB, group VB and group VIB; B includes one or more elements selected from group IA, group IIA, group IIIA, group IVA, group VA, group IIB, group IVB, group VB, group VIB and group VIII; C includes one or more elements selected from group IIIA, group IVA, group VA and group VIA; D includes one or more elements selected from group VIA and group VIIA; a is selected from the range of 0.85 to 1.15; x is selected from the range of 0 to 0.1; y is selected from the range of 0.001 to 0.999; z is selected from the range of 0 to 0.5; and n is selected from the range of 0 to 0.5.

Unless otherwise specified, in the aforementioned chemical formula, when A is two or more elements, the definition for the value range of x is not only a definition for the stoichiometric number of each element as A, but also a definition for the sum of the stoichiometric numbers of the elements as A. For example, when A is two or more elements A1, A2. . . . An, the respective stoichiometric numbers x1, x2 . . . xn of the A1, A2. . . . An must each fall within the numerical range for x defined in the present application, and the sum of x1, x2, . . . xn must also fall within the numerical range.

Similarly, in the case that other symbols mentioned in the embodiments of the present application (such as B, C, D, M, M', X, Z, P, Q, $A^1$, $B^1$, $C^1$, $D^1$, $A^2$, $B^2$, $A^3$, $A^4$) are more than two elements, the definition of the numerical range of their stoichiometric numbers in the present application also has the above meaning.

The first positive electrode active material is obtained by doping elements in the compound $LiMnPO_4$, wherein A, B, C and D are elements doped at the Li site, Mn site, P site and O site of the compound $LiMnPO_4$, respectively. Without wishing to be bound by theory, it is currently believed that the performance improvement of lithium manganese phosphate is related to reducing the lattice change rate of lithium manganese phosphate during lithium (de)intercalation and reducing the surface activity. Reducing the lattice change rate can reduce the lattice constant difference between the two phases at the grain boundary, reduce the interface stress, and enhance the $Li^+$ transport capacity at the interface, thereby improving the rate performance of the first positive electrode active material. However, high surface activity can easily lead to serious side reactions at the interface, exacerbating gas production, electrolyte consumption and interface damage, thus affecting the battery's cycling performance. The lattice change rate can be reduced by doping at the Li site and/or Mn site. Mn-site doping can also effectively reduce surface activity, thereby reducing Mn dissolution and the interfacial side reactions between the first positive electrode active material and the electrolyte solution. P-site doping makes the change rate of Mn—O bond length faster and reduces the migration potential barrier of small polarons in the material, which helps to improve electronic conductivity. O-site doping has a good effect on reducing interfacial side reactions. Doping at P and/or O sites also affects the Mn dissolution and kinetic performance of antisite defects. Therefore, doping reduces the antisite defect concentration in the material, improves the kinetic performance and gram capacity of the material, and can also change the morphology of the particles, thereby increasing the compacted density. The inventor unexpectedly discovered that by doping a specific element in a specific amount at the Mn site, and optionally at the Li site, P site and/or O site, of the compound $LiMnPO_4$, improved rate performance can be obtained, while reducing the dissolution of Mn and the doping element at the Mn site, obtaining improved cycling performance and/or high-temperature stability, and also increasing the gram capacity and compacted density of the material.

In some embodiments, A includes one or more elements selected from Rb, Cs, Be, Ca, Sr, Ba, Ga, In, Cd, V, Ta, Cr, Zn, Al, Na, K, Mg, Nb, Mo and W, and optionally includes one or more elements selected from Zn, Al, Na, K, Mg, Nb, Mo and W; and/or, B includes one or more elements selected from Rb, Cs, Be, Ca, Sr, Ba, In, Pb, Bi, Cd, Hf, Ta, Cr, Ru, Rh, Pd, Os, Ir, Pt, Zn, Al, Na, K, Mg, Mo, W, Ti, V, Zr, Fe, Ni, Co, Ga, Sn, Sb, Nb and Ge, and optionally includes one or more elements selected from Zn, Al, Na, K, Mg, Mo, W, Ti, V, Zr, Fe, Ni, Co, Ga, Sn, Sb, Nb and Ge; and/or, C includes one or more elements selected from B (boron), S, Si and N; and/or, D includes one or more elements selected from S, F, Cl, and Br.

In some embodiments, A includes any element selected from Zn, Al, Na, K, Mg, Nb, Mo and W, and optionally includes any element selected from Mg and Nb.

B includes one or more elements selected from Ti, V, Zr, Fe, Ni, Mg, Co, Ga, Sn, Sb, Nb and Ge, optionally includes at least two elements selected from Ti, V, Zr, Fe, Ni, Mg, Co, Ga, Sn, Sb, Nb and Ge, further optionally includes at least two elements selected from Fe, Ti, V, Ni, Co and Mg, further optionally includes at least two elements selected from Fe, Ti, V, Co and Mg, and still further optionally includes Fe and one or more elements selected from Ti, V, Co and Mg; and/or, C includes any element selected from B (boron), S, Si and N, and optionally S; and/or, D includes any element selected from S, F, Cl and Br, and optionally F.

By selecting the Li-site doping element within the above range, the lattice change rate during the delithiation process can be further reduced, thereby further improving the rate performance of the battery. By selecting the Mn-site doping element within the above range, the electronic conductivity can be further improved and the lattice change rate can be further reduced, thereby improving the rate performance and gram capacity of the battery. By selecting the P-site doping element within the above range, the rate performance of the battery can be further improved. By selecting the O-site doping element within the above range, the side reactions at the interface can be further reduced and the high-temperature performance of the battery can be improved.

In some embodiments, a is selected from the range of 0.9 to 1.1, and optionally from the range of 0.97 to 1.01; and/or, x is selected from the range of 0.001 to 0.005; and/or, y is selected from the range of 0.001 to 0.5, optionally from the range of 0.01 to 0.5, and optionally from the range of 0.25 to 0.5; and/or, z is selected from the range of 0.001 to 0.5, optionally from the range of 0.001 to 0.1, and more optionally from the range of 0.001 to 0.005; and/or, n is selected from the range of 0 to 0.1, and optionally from the range of 0.001 to 0.005.

By selecting the y value within the above range, the gram capacity and rate performance of the first positive electrode active material can be further improved. By selecting the x value within the above range, the kinetic performance of the first positive electrode active material can be further improved. By selecting the z value within the above range, the rate performance of the battery can be further improved. By selecting the n value within the above range, the high-temperature performance of the battery can be further improved.

In some embodiments, x is 0, z is selected from the range of 0.001 to 0.5, and n is selected from the range of 0.001 to 0.1; or, x is selected from the range of 0.001 to 0.1, z is 0, and n is selected from the range of 0.001 to 0.1; or, x is selected from the range of 0.001 to 0.1, z is selected from the range of 0.001 to 0.5, and n is 0; or, x is 0, z is 0, and n is selected from the range of 0.001 to 0.1; or, x is 0, z is selected from the range of 0.001 to 0.5, and n 0; or, x is selected from the range of 0.001 to 0.1, z is selected from the range of 0.001 to 0.5, and n is selected from the range of 0.001 to 0.1.

Thus, by doping a specific element in a specific amount at the Mn site of the compound $LiMnPO_4$ and optionally at the Li site, P site and/or O site, especially doping a specific element in a specific amount at the Mn site and P site of $LiMnPO_4$ or at the Li site, Mn site, P site and O site of $LiMnPO_4$, the rate performance can be improved, the dissolution of Mn and the doping element at the Mn site can be reduced, the cycling performance and/or high-temperature stability can be improved, and the gram capacity and compacted density of the first positive electrode active material can be increased.

In some embodiments, y:z is selected from the range of 0.002 to 999, optionally from the range of 0.025 to 999 or the range of 0.002 to 500, more optionally from the range of 0.2 to 600, for example, 0.2, 0.25, 1, 2, 3, 4, 5, 6, 8, 10, 12, 13, 15, 17, 20, 70, 80, 84, 67, 91, 100, 134, 150, 182, 200, 250, 300, 320, 350, 400, 420, 450, 500, 600, 999 or a range consisting of any two of the above values. As a result, the defects of the first positive electrode active material can be reduced, and the integrity of the framework structure of the first positive electrode active material can be improved, thereby effectively improving the structural stability of the first positive electrode active material and in turn improving the cycling stability of the battery.

In some embodiments, z:n is selected from the range of 0.002 to 500, optionally from the range of 0.2 to 100, and more optionally from the range of 0.2 to 50, for example 0.2, 0.8, 1, 1.25, 4, 5, 50 or a range consisting of any two of the above values. As a result, the defects of the first positive electrode active material can be further reduced, and the integrity of the framework structure of the first positive electrode active material can be further improved, thereby effectively improving the structural stability of the first positive electrode active material and improving the cycling stability of the battery.

In some embodiments, (1−y):y is in the range of 0.1-999, optionally in the range of 0.1-10 or in the range of 0.67-999, more optionally in the range of 1 to 10, further optionally in the range of 1 to 4, and still further optionally in the range of 1.5 to 3; and/or, a:x is in the range of 1 to 1200, optionally in the range of 9 to 1100, and more optionally in the range of 190-998.

Here, y represents the sum of the stoichiometric numbers of the doping element at the site of Mn. When the above conditions are satisfied, the energy density and cycling performance of the first positive electrode active material can be further improved.

In some embodiments, z:(1−z) is 1:9 to 1:999, and optionally 1:499 to 1:249. When the above conditions are satisfied, the energy density and cycling performance of the first positive electrode active material can be further improved.

In some embodiments, A includes one or more elements selected from Zn, Al, Na, K, Mg, Nb, Mo and W; B includes one or more elements selected from Ti, V, Zr, Fe, Ni, Mg, Co, Ga, Sn, Sb, Nb and Ge; C includes one or more elements selected from B (boron), S, Si and N; D includes one or more elements selected from S, F, Cl and Br; a is selected from the range of 0.9 to 1.1, x is selected from the range of 0.001 to 0.1, y is selected from the range of 0.001 to 0.5, z is selected from the range of 0.001 to 0.1, and n is selected from the range of 0.001 to 0.1.

By simultaneously doping specific elements at specific amounts at the Li site, Mn site, P site and O site of the compound $LiMnPO_4$, improved rate performance can be obtained, while reducing the dissolution of Mn and the doping element at the Mn site, obtaining improved cycling performance and/or high-temperature stability as well as increased gram capacity and compacted density of the first positive electrode active material.

In some embodiments, B includes one or more elements selected from Zn, Al, Na, K, Mg, Mo, W, Ti, V, Zr, Fe, Ni, Co, Ga, Sn, Sb, Nb and Ge, and optionally includes one or more elements selected from Zn, Fe, Ti, V, Ni, Co and Mg; C includes one or more elements selected from B (boron), Si, N and S; a is selected from the range of 0.9 to 1.1, x is 0, y is selected from the range of 0.001 to 0.5, z is selected from the range of 0.001 to 0.1, and n is 0.

By simultaneously doping specific elements at specific amounts at the Mn site and P site of the compound $LiMnPO_4$, it can improve the rate performance, reduce the dissolution of Mn and the doping element at the Mn site, improve the cycling performance and/or high-temperature stability, and increase the gram capacity and compacted density of the first positive electrode active material.

In some embodiments, the first positive electrode active material comprises an inner core and a shell cladding the inner core, and the inner core comprises the compound represented by the above formula (I). The shell comprises one or more cladding layers. Each cladding layer has ionic conductivity and/or electronic conductivity. In practice, each cladding layer may be in a fully or partially cladding state.

By providing a cladding layer with ionic conductivity and/or electronic conductivity on the surface of the inner core, a first positive electrode active material with an inner core-shell structure is provided, and applying the first positive electrode active material to a battery can improve the high-temperature cycling performance, cycling stability and high-temperature storage performance of the battery.

In some embodiments, the one or more cladding layers each independently comprise one or more selected from pyrophosphate, phosphate, carbon, doped carbon, oxide, boride and polymer.

In some embodiments, the shell comprises a cladding layer; optionally, the cladding layer comprises one or more selected from pyrophosphate, phosphate, carbon, doped carbon, oxide, boride and polymer.

The above materials can be used to obtain a cladding layer with ionic conductivity and/or electronic conductivity, thereby improving the high-temperature cycling performance, cycling stability and high-temperature storage performance of the battery.

In some embodiments, the shell comprises a first cladding layer cladding the inner core and a second cladding layer cladding the first cladding layer; optionally, the first cladding layer and the second cladding layer each independently comprise one or more selected from pyrophosphate, phosphate, carbon, doped carbon, oxide, boride and polymer.

Using the above materials as the materials for the cladding layers and providing two cladding layers can further improve the high-temperature cycling performance, cycling stability and high-temperature storage performance of the battery.

In some embodiments, the first cladding layer comprises one or more selected from pyrophosphate, phosphate, oxide, and boride, and the second cladding layer comprises one or more selected from carbon and doped carbon.

The use of a first cladding layer of a specific material and a second cladding layer of a specific material can further improve the rate performance and further reduce the dissolution of Mn and Mn-site doping elements, thereby improving the cycling performance and/or high-temperature stability of the battery.

In some embodiments, the shell comprises a first cladding layer cladding the inner core, a second cladding layer cladding the first cladding layer and a third cladding layer cladding the second cladding layer; optionally, the first cladding layer, the second cladding layer and the third cladding layer each independently comprise one or more selected from pyrophosphate, phosphate, carbon, doped carbon, oxide, boride and polymer. “Polymer” can be either a low polymer or a high polymer, which is not limited in the embodiments of the present application.

Using the above materials as the materials for the cladding layers and providing three cladding layers can further reduce the dissolution of Mn and Mn-site doping elements, and further improve the high-temperature cycling performance, cycling stability and high-temperature storage performance of the battery.

In some embodiments, the first cladding layer comprises pyrophosphate, the second cladding layer comprises one or more selected from phosphate, oxide, and boride, and the third cladding layer comprises one or more selected from carbon and doped carbon.

The use of a first cladding layer of a specific material, a second cladding layer of a specific material, and a third cladding layer of a specific material further improves the rate performance, further reduces the dissolution of Mn and Mn-site doping elements, thereby improving the cycling performance and/or high-temperature stability of the battery, and further increasing the gram capacity and compacted density of the first positive electrode active material.

In some embodiments, the pyrophosphate is $M_b(P_2O_7)_c$; and/or, the phosphate is $X_m(PO_4)_q$; and/or, the doping element in the doped carbon includes one or more elements selected from group IIIA, group VA, group VIA and group VIIA; and/or, the oxide is $M'_dO_e$; and/or, the boride is $Z_vB_w$; and/or, the polymer includes one or more selected from polysaccharides and their derivatives, and polysiloxanes;

M, X and Z each independently include one or more elements selected from group IA, group IIA, group IIIA, group IB, group IIB, group IVB, group VB, group VIIB and group VIII;

b is selected from the range of 1 to 4, c is selected from the range of 1 to 6; m is selected from the range of 1 to 2, and q is selected from the range of 1 to 4; M' includes one or more elements selected from alkali metals, alkaline earth metals, transition metals, group IIIA elements, group IVA elements, lanthanides and Sb;

d is greater than 0 and less than or equal to 2, e is greater than 0 and less than or equal to 5;

v is selected from the range of 1-7, and w is selected from the range of 1-2.

By using the above materials as the cladding layer, the dissolution of Mn and Mn-site doping elements can be further reduced, the gram capacity and compacted density of the first positive electrode active material can be further increased, and the rate performance, high-temperature cycling performance and high-temperature storage performance of the battery can be further improved.

In some embodiments, M, X and Z each independently include one or more elements selected from Li, Fe, Ni, Mg, Co, Cu, Zn, Ti, Ag, Zr, Nb, Mn and Al; and/or, the doping element in the doped carbon includes one or more selected from nitrogen, phosphorus, sulfur, boron and fluorine; and/or, M' includes one or more elements selected from Li, Be, B, Na, Mg, Al, Si, P, K, Ca, Sc, Ti, V, Cr, Mn, Fe, Co, Ni, Cu, Zn, Ga, Ge, As, Se, Sr, Y, Zr, Nb, Mo, Tc, Ru, Rh, Pd, Ag, Cd, In, Sn, Sb, Te, W, La and Ce, and optionally includes one or more elements selected from Mg, Al, Si, Zn, Zr and Sn; and/or, the polysiloxane is selected from one or more of linear polysiloxane and cyclic polysiloxane; and/or, the polysaccharide is selected from one or more of plant polysaccharide and marine polysaccharide.

By using the above-mentioned specific material as the cladding layer, the dissolution of Mn and Mn-site doping elements can be further reduced, and the high-temperature cycling performance and high-temperature storage performance of the battery can be further improved.

In some embodiments, the first positive electrode active material comprises an inner core and a shell cladding the inner core.

The inner core comprises $Li_aMn_{1-y}ByP_{1-z}C_zO_4$, a is selected from the range of 0.9 to 1.1, y is selected from the range of 0.001 to 0.5, z is selected from the range of 0.001 to 0.1, B includes one or more elements selected from Ti, V, Zr, Fe, Ni, Mg, Co, Ga, Sn, Sb, Nb and Ge, and C includes one or more elements selected from B (boron), S, Si and N.

The shell comprises a first cladding layer cladding the inner core and a second cladding layer cladding the first cladding layer, the first cladding layer comprises pyrophosphate $MP_2O_7$ and phosphate $XPO_4$, M and X each independently include one or more elements selected from Li, Fe, Ni, Mg, Co, Cu, Zn, Ti, Ag, Zr, Nb and Al; and the second cladding layer comprises carbon.

The first positive electrode active material may be an inner core-shell structure having two cladding layers. The element B doped at the manganese site of the lithium manganese phosphate helps to reduce the lattice change rate of the lithium manganese phosphate during lithium (de) intercalation, thereby improving the structural stability of the first positive electrode active material, greatly reducing the dissolution of manganese and reducing the oxygen activity on the particle surface. The element C doped at the phosphorus site helps to change the difficulty of the Mn—O bond length change, thereby reducing the potential barrier to lithium ion migration, promoting lithium ion migration, and improving the battery's rate performance. The first cladding layer of the first positive active material comprises pyrophosphate and phosphate. Since the migration potential barrier of transition metals in pyrophosphate is relatively high (>1 eV), the dissolution of transition metals can be effectively reduced. Phosphates have excellent ability to conduct lithium ions and can reduce the surface impurity lithium content. In addition, since the second cladding layer is a carbon-containing layer, it can effectively improve the electrical conductivity and desolvation ability of $LiMnPO_4$. In addition, the "barrier" effect of the second cladding layer can further reduce the migration of manganese ions into the electrolyte solution and reduce the corrosion of the electrolyte solution to the second active material. Therefore, by doping lithium manganese phosphate with specific elements and cladding its surface, the dissolution of Mn during lithium (de)intercalation can be effectively reduced, while promoting the migration of lithium ions, thereby improving the rate performance of the battery and enhancing the cycling performance and high-temperature performance of the battery.

In some embodiments, the first positive electrode active material comprises an inner core and a shell cladding the inner core.

The inner core comprises $Li_aMn_{1-y}ByP_{1-z}C_zO_4$, a is selected from the range of 0.9 to 1.1, y is selected from the range of 0.001 to 0.5, z is selected from the range of 0.001 to 0.1, B includes one or more elements selected from Ti, V, Zr, Fe, Ni, Mg, Co, Ga, Sn, Sb, Nb and Ge, and C includes one or more elements selected from B (boron), S, Si and N.

The shell comprises a first cladding layer cladding the inner core, a second cladding layer cladding the first cladding layer and a third cladding layer cladding the second cladding layer.

The first cladding layer comprises pyrophosphate $Li_fQP_2O_7$ and/or $Q_g(P_2O_7)_h$, where $0 \le f \le 2$, $1 \le g \le 4$, and $1 \le h \le 6$, and Q in pyrophosphate $Li_fQP_2O_7$ and/or $Q_g(P_2O_7)$ n each independently includes one or more elements selected from Fe, Ni, Mg, Co, Cu, Zn, Ti, Ag, Zr, Nb and Al.

The second cladding layer comprises crystalline phosphate $XPO_4$, where X includes one or more elements selected from Li, Fe, Ni, Mg, Co, Cu, Zn, Ti, Ag, Zr, Nb and Al.

The third cladding layer comprises carbon.

The first positive electrode active material has an inner core-shell structure. By doping element B and element C respectively at the manganese and phosphorus sites of the inner core, not only can the manganese dissolution be effectively reduced, thereby reducing the manganese ions migrating to the negative electrode, reducing the electrolyte solution consumed due to the decomposition of the SEI film, and improving the cycle performance of the battery, but also it can promote the adjustment of the Mn—O bond length and reduce the potential barrier to lithium ion migration, promote the migration of lithium ions and improve the rate performance of batteries. By cladding the inner core with the first cladding layer comprising pyrophosphate, the migration resistance of manganese can be further increased, its dissolution can be reduced, and the content of surface lithium impurities can be decreased, as well as the contact between the inner core and the electrolyte solution, thereby reducing interfacial side reactions, decreasing gas generation, and improving the high-temperature storage performance and cycling performance of the battery. By further cladding the phosphate cladding layer with excellent lithium-ion conduction ability, the interfacial side reactions on the surface of the first positive electrode active material can be effectively reduced, thereby improving the high-temperature cycling and storage performance of the battery. By further cladding the carbon layer as the third cladding layer, the kinetic performance of the battery can be further enhanced. In addition, in the inner core, the doping of element B at the manganese site also helps to reduce the lattice change rate of lithium manganese phosphate during the process of (de) intercalating lithium, improve the structural stability of the first positive electrode active material, greatly reduce the dissolution of manganese and reduce the oxygen activity on the particle surface. The doping of element C at the phosphorus site also helps to change the difficulty in changing the Mn—O bond length, thereby improving the electronic conductivity and reducing the potential barrier to lithium ion migration, promoting lithium ion migration and improving the rate performance of batteries.

In addition, the entire core system remains electrically neutral, to ensure as few defects and impurity phases in the first positive electrode active material as possible. If there is an excess of transition metals (such as manganese) in the first positive electrode active material, due to the relatively stable structure of the material system, the excessive transition metals are likely to be precipitated in the form of elemental substances, or form impurity phases inside the lattice. Remaining electrically neutral can minimize such impurity phases. In addition, ensuring the electrical neutrality of the system can also generate lithium vacancies in the material in some cases, so that the kinetic performance of the first positive electrode active material becomes much better.

In some embodiments, the one or more cladding layers in the shell that are farthest from the inner core each independently comprise one or more selected from polysiloxanes, polysaccharides and polysaccharide derivatives.

As a result, the uniformity of cladding can be improved, and the interfacial side reactions caused by high voltage can be effectively blocked, thereby improving the high-temperature cycling performance and high-temperature storage performance of the first positive electrode active material; and the cladding layer has good ionic conductivity, which helps to improve the gram capacity of the first positive electrode active material while reducing the heat generation of the battery.

In some embodiments, the polysiloxane comprises a structural unit represented by formula (i) below, (i)

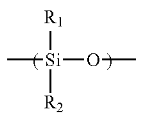

$R_1$ and $R_2$ are independently selected from H, —COOH, —OH, —SH, —CN, —SCN, amino, phosphate, carboxylate, amido, aldehyde, sulfonyl, polyether segment, C1-C20 aliphatic hydrocarbon groups, C1-C20 halogenated aliphatic hydrocarbon groups, C1-C20 heteroaliphatic hydrocarbon groups, C1-C20 halogenated heteroaliphatic hydrocarbon groups, C6-C20 aromatic hydrocarbon groups, C6-C20 halogenated aromatic hydrocarbon groups, C2-C20 heteroaromatic hydrocarbon groups and C2-C20 halogenated heteroaromatic hydrocarbon groups;

optionally, $R_1$ and $R_2$ are independently selected from H, amino, phosphate, polyether segment, C1-C8 alkyl, C1-C8 haloalkyl, C1-C8 heteroalkyl, C1-C8 haloheteroalkyl, C2-C8 alkenyl and C2-C8 haloalkenyl.

In some embodiments, the polysiloxane further comprises an end-capping group, and the end-capping group includes one or more of the group consisting of the following functional groups: polyether, C1-C8 alkyl, C1-C8 haloalkyl, C1-C8 heteroalkyl, C1-C8 haloheteroalkyl, C2-C8 alkenyl, C2-C8 haloalkenyl, C6-C20 aromatic hydrocarbon group, C1-C8 alkoxy, C2-C8 epoxy, hydroxyl, C1-C8 hydroxyalkyl, amino, C1-C8 aminoalkyl, carboxyl, and C1-C8 carboxylalkyl.

In some embodiments, the polysiloxane includes one or more selected from polydimethylsiloxane, polydiethylsiloxane, polymethylethylsiloxane, polymethylvinylsiloxane, polyphenylmethylsiloxane, polymethylhydrogensiloxane, carboxyl functionalized polysiloxane, epoxy-terminated polysiloxane, methoxy-terminated polydimethylsiloxane, hydroxypropyl-terminated polydimethylsiloxane, polymethylchloropropylsiloxane, hydroxy-terminated polydimethylsiloxane, polymethyltrifluoropropylsiloxane, perfluorooctylmethylpolysiloxane, aminoethylaminopropylpolydimethylsiloxane, polyether-terminated polydimethylsiloxane, aminopropyl-branched polysiloxane, aminopropyl-terminated polydimethylsiloxane, phosphate-branched grafted polydimethylsiloxane, polyether-branched grafted polydimethylsiloxane, 1,3,5,7-octamethylcyclotetrasiloxane, 1,3,5,7-tetrahydro-1,3,5,7-tetramethylcyclotetrasiloxane, cyclopentapolydimethylsiloxane, 2,4,6,8-tetramethylcyclotetrasiloxane, 2,4,6,8-tetramethyl-2,4,6,8-tetravinylcyclotetrasiloxane, cyclic polymethylvinylsiloxane, hexadecamethylcyclooctasiloxane, tetradecamethylcycloheptasiloxane, and cyclic polydimethylsiloxane.

In some embodiments, the number average molecular weights of the polysiloxane, the polysaccharide and the polysaccharide derivative are each independently 300,000 or less, optionally 10,000 to 200,000, more optionally 20,000 to 120,000, and further optionally 400 to 80,000.

The number average molecular weight of polysiloxane, polysaccharide and polysaccharide derivatives can be determined by methods known in the art, for example, using gel permeation chromatography (GPC). The testing instrument may be a PL-GPC 220 high-temperature gel permeation chromatograph.

In some embodiments, the percentage mass content of polar functional groups in the polysiloxane is α, 0≤α≤50%, optionally, 5%≤α≤30%.

"The percentage mass content of polar functional groups in the polysiloxane" refers to the percentage mass content of polar functional groups in $R_1$, $R_2$ and end-capping groups in the polysiloxane. Polar functional groups include one or more of —COOH, —OH, —SH, —CN, —SCN, amino (including $—NH_2$, —NH—), phosphate, carboxylate (—COO—), amido (—CONH—), aldehyde (—CHO), sulfonyl ($—S(═O)_2—$), polyether segment, halogen, alkoxy, and epoxy. When the above polar functional groups are directly connected to silicon atoms, a represents the mass fraction of these polar functional groups in polysiloxane; when the above polar functional groups are not directly connected to silicon atoms, a represents the sum of the mass fractions of polar functional groups and divalent to tetravalent methyl (such as $—CH_2$, —CH—, —C—) directly connected thereto in polysiloxane, where "divalent to tetravalent methyl" represent carbon atoms directly connected to polar functional groups and located between polar functional groups and silicon atoms, as well as other non-polar functional groups connected to carbon atoms. Taking polymethyltrifluoropropylsiloxane as an example, α refers to the percentage mass content of $—CF_3$ therein, excluding the ethylene therein; taking polymethylchloropropylsiloxane as an example, α refers to the percentage mass content of $—CH_2Cl$, excluding the ethylene therein; taking hydroxypropyl-terminated polydimethylsiloxane as an example, α refers to the percentage mass content of $—CH_2OH$. The percentage mass content of polar functional groups in the polysiloxane can be determined by methods known in the art, such as titration (eg, acid-base titration, redox titration, precipitation titration), infrared spectroscopy, and nuclear magnetic resonance spectroscopy.

In some embodiments, the substituents attached to the sugar units in the polysaccharide and polysaccharide derivative each independently include one or more of the group consisting of the following functional groups: —OH, —COOH and salts thereof, —R—OH, $—SO_3H$ and salts thereof, —R—OH, $—R—SO_3H$ and salts thereof, sulfate, alkoxy, where R represents alkylene, optionally C1-C5 alkylene.

Optionally, the substituents attached to the sugar units in the polysaccharide and polysaccharide derivative each independently include one or more of the group consisting of the following functional groups: —OH, —COOH, —COOLi, —COONa, —COOK, $—SO_3H$, $—SO_3Li$, $—SO_3Na$, $—SO_3K$, $—CH_2—SO_3H$, $—CH_2—SO_3Li$, $—CH_2—SO_3Na$, $—CH_2—SO_3K$, methoxy, and ethoxy.

The term "substituents attached to the sugar unit" includes all groups attached to the sugar unit backbone.

In some embodiments, the polysaccharide includes one or more selected from pectin, carboxymethyl starch, hydroxypropyl starch, dextrin, cellulose ether, carboxymethyl chitosan, hydroxyethyl cellulose, carboxymethyl cellulose, carboxypropyl methyl cellulose, guar gum, sesbania gum, gum arabic, lithium alginate, sodium alginate, potassium alginate, fucoidan, agar, carrageenan, carrageenin, xanthan gum and fenugreek gum.

In some embodiments, the percentage mass content of substituents attached to the sugar units in the polysaccharide and polysaccharide derivative can be determined by known methods in the art, such as titration (e.g., acid-base titration, redox titration, precipitation titration), infrared spectroscopy, and nuclear magnetic resonance spectroscopy.

In some embodiments, the lattice mismatch between the material of the inner core and the material of the shell is less than 10%. This can improve the contact between the inner core and the shell (or cladding layer) to prevent the shell (or cladding layer) from falling off.

In some embodiments, based on the weight of the positive electrode active material, the manganese element content is in the range of 10 wt % to 35 wt %, optionally in the range of 13.3 wt % to 33.2 wt %, more optionally in the range of 15 wt % to 30 wt %, and further optionally in the range of 17 wt % to 20 wt %; and/or, the phosphorus element content is in the range of 12 wt %-25 wt %, optionally in the range of 15 wt %-20 wt %, and more optionally in the range of 16.8 wt %-19.5 wt %; and/or, the weight ratio of manganese element to phosphorus element is in the range of 0.71-1.85, optionally 0.90-1.25, and more optionally 0.95-1.20.

In the case where manganese is contained only in the inner core of the first positive electrode active material, the content of manganese may correspond to the content in the inner core.

Limiting the content of manganese within the above range can further improve the stability and density of the first positive electrode active material, thereby improving the battery's cycling performance, storage performance and compacted density, etc.; and can maintain higher voltage plateau, thereby improving the battery's energy density.

Limiting the content of phosphorus within the above range can effectively reduce the influence of small polaron conductivity on the conductivity of the first positive electrode active material, and can further improve the stability of the lattice structure, thereby improving the overall stability of the first positive electrode active material.

Limiting the weight ratio of manganese to phosphorus within the above range can further reduce manganese dissolution, improve the stability and gram capacity of the first positive electrode active material, and improve the cycling performance and storage performance of the battery; it can also reduce impurity phases, enable the first positive electrode active material to maintain higher discharge voltage plateau, and enable the battery to have high energy density.

The measurement of elements manganese and phosphorus can be carried out by conventional technical means in the art. In particular, the contents of manganese and phosphorus are determined as follows. The material is dissolved in dilute hydrochloric acid (with a concentration of 10-30%), the contents of various elements in the solution are tested by ICP, and then the content of manganese is measured and calculated, to get its weight ratio.

In some embodiments, the surface of the first positive electrode active material is cladded with one or more of carbon and doped carbon; optionally, the surface of the first positive electrode active material is cladded with carbon. Thus, the conductivity of the first positive electrode active material can be improved.

In some embodiments, the doping element in the doped carbon includes one or more selected from nitrogen, phosphorus, sulfur, boron and fluorine. It is convenient to control the performance of the doped carbon layer.

In some embodiments, the cladding amount of the shell (only one cladding layer) is 0.1 wt % to 6 wt % based on the weight of the inner core. The cladding amount of the cladding layers is preferably within the above range, which can fully coat the inner core and further improve the kinetic performance of the battery without sacrificing the gram capacity of the first positive electrode active material.

In some embodiments, the cladding amount of the first cladding layer is greater than 0 and less than or equal to 7 wt %, optionally greater than 0 and less than or equal to 6 wt %, more optionally greater than 0 and less than or equal to 5.5 wt % or 4-5.6 wt %, and further optionally greater than 0 and less than or equal to 2 wt %, based on the weight of the inner core; and/or

- the cladding amount of the second cladding layer is greater than 0 and less than or equal to 6 wt %, optionally greater than 0 and less than or equal to 5.5 wt %, and more optionally 2-4 wt % or 3-5 wt %, based on the weight of the inner core; and/or,
- the cladding amount of the third cladding layer is greater than 0 and less than or equal to 6 wt %, optionally greater than 0 and less than or equal to 5.5 wt %, and more optionally greater than 0 and less than or equal to 2 wt %, based on the weight of the inner core.

In some embodiments, the shell further comprises a fourth cladding layer cladding the third cladding layer and a fifth cladding layer cladding the fourth cladding layer.

The cladding amounts of the fourth cladding layer and the fifth cladding layer are each independently 0.01 wt % to 10 wt %, optionally 0.05 wt % to 10 wt %, more optionally 0.1 wt % to 5 wt %, and further 0.1 wt % to 2 wt %, based on the weight of the inner core.

The cladding amount of the cladding layer is preferably within the above range, which can fully coat the inner core and further improve the kinetic performance of the battery without sacrificing the gram capacity of the first positive electrode active material.

In some embodiments, the shell is located on 40% to 90% of the surface of the inner core, optionally 60% to 80% of the surface. Therefore, the inner core can be fully cladded, thereby improving the kinetic performance of the battery.

In some embodiments, the thickness of the shell (only one cladding layer) is 1-15 nm.

In some embodiments, the thickness of the first cladding layer is 1-10 nm, and optionally 2-10 nm; and/or,

- the thickness of the second cladding layer is 2-25 nm, optionally 2-15 nm, and more optionally 3-15 nm; and/or,
- the thickness of the third cladding layer is 2-25 nm, and optionally 5-25 nm.

In some embodiments, the thickness of the first cladding layer may be about 2 nm, about 3 nm, about 4 nm, about 5 nm, about 6 nm, about 7 nm, about 8 nm, about 9 nm, or about 10 nm, or within any range defined by any value above.

In some embodiments, the thickness of the second cladding layer may be about 2 nm, about 3 nm, about 4 nm, about 5 nm, about 6 nm, about 7 nm, about 8 nm, about 9 nm, about 10 nm, about 11 nm, about 12 nm, about 13 nm, about 14 nm, about 15 nm, or within any range defined by any value above.

In some embodiments, the thickness of the third cladding layer may be about 2 nm, about 3 nm, about 4 nm, about 5 nm, about 6 nm, about 7 nm, about 8 nm, about 9 nm, about 10 nm, about 11 nm, about 12 nm, about 13 nm, about 14 nm, about 15 nm, about 16 nm, about 17 nm, about 18 nm, about 19 nm, about 20 nm, about 21 nm, about 22 nm, about 23 nm, about 24 nm, about 25 nm, or within any range defined by any value above.

The first cladding layer has the above thickness range, which can further reduce the adverse effect on the kinetic performance of the first positive electrode active material.

When the second cladding layer has the above thickness range, the surface structure of the second cladding layer is stable, and the side reaction with the electrolyte solution is less, so the interfacial side reactions can be effectively reduced, thereby improving the high-temperature performance of batteries.

When the third cladding layer has the above thickness range, the electrical conductivity performance of the first positive electrode active material can be improved and the compacted density of the positive electrode plate prepared with the positive electrode active material can be improved.

The thickness of the cladding layer is mainly tested by FIB. The specific method may comprises the following steps: randomly selecting a single particle from the first positive electrode active material powder to be tested, cutting a thin slice with a thickness of about 100 nm from a middle site of or near the middle site of the selected particle, testing the slice by TEM, determining the thickness of the cladding layer, and averaging the measurements of 3-5 sites.

In some embodiments, the one or more cladding layers each independently comprise one or more selected from pyrophosphate, phosphate, and oxide, and the one or more selected from pyrophosphate, phosphate, and oxide are crystalline.

Optionally, the crystallinities of the pyrophosphate, the phosphate and the oxide are each independently from 10% to 100%, and more optionally from 50% to 100%.

Herein, crystalline means that the degree of crystallinity is 50% or higher, that is, 50%-100%. That is, when the crystalline pyrophosphate and crystalline phosphate of the present application appear, it indicates that the crystallinity is 50% to 100%.

Pyrophosphate and phosphate with a certain degree of crystallinity not only promote the full exertion of the ability of the pyrophosphate cladding layer to reduce manganese dissolution and the excellent lithium ion-conducting ability of the phosphate cladding layer to reduce the interfacial side reactions, but also allow for better lattice matching between the pyrophosphate cladding layer and the phosphate cladding layer, thereby enabling tight bonding between the cladding layers.

It should be noted that in the present application, the crystallinity can be adjusted, for example, by adjusting the process conditions in the sintering process, such as sintering temperature and sintering time. The crystallinity can be measured by methods known in the art, such as X-ray diffraction, densimetry, infrared spectroscopy, differential scanning calorimetry, and nuclear magnetic resonance absorption. A specific X-ray diffraction method for testing the crystallinity of the first positive electrode active material may include the following steps:

- taking a certain amount of the first positive electrode active material powder and measuring the total scattering intensity by X-ray, which is the sum of the scattering intensities of all matter in space and is only related to the intensity of the primary rays, the chemical structure of the first positive electrode active material powder, and the total number of electrons participating in the diffraction, i.e. the mass, but has nothing to do with the order state of the sample; then separating the crystalline scattering and the non-crystalline scattering from the diffraction pattern, wherein crystallinity is the ratio of the scattering of the crystalline part to the total scattering intensity.

In some embodiments, in the shell, the weight ratio of pyrophosphate to phosphate and the weight ratio of pyrophosphate to oxide are each independently 1:3 to 3:1, and optionally 1:3 to 1:1. Therefore, by having pyrophosphate and phosphate in a suitable weight ratio range or pyrophosphate and oxide in a suitable weight ratio range, it can effectively reduce manganese dissolution, effectively reduce the surface impurity lithium content, and reduce interfacial side reactions, thereby improving the high-temperature storage performance and high-temperature cycling performance of the battery.

In some embodiments, the one or more cladding layers each independently comprise carbon, and the carbon is a mixture of SP2-form carbon and SP3-form carbon; optionally, the molar ratio of SP2-form carbon to SP3-form carbon in the carbon is any value within the range of 0.07-13, more optionally any value within the range of 0.1-10, and further optionally any value within the range of 2.0-3.0.

In some embodiments, the molar ratio of SP2-form carbon to SP3-form carbon may be about 0.1, about 0.2, about 0.3, about 0.4, about 0.5, about 0.6, about 0.7, about 0.8, about 0.9, about 1, about 2, about 3, about 4, about 5, about 6, about 7, about 8, about 9, or about 10, or within any range defined by any value above.

In the present application, "about" before a numerical value indicates a range, indicating a range of ±10% of the numerical value.

By selecting the form of carbon in the carbon cladding layer, the overall electrical performance of the secondary battery can be improved. Specifically, by using a mixture of SP2-form carbon and SP3-form carbon and limiting the ratio of SP2-form carbon to SP3-form carbon within a certain range, the following situations can be avoided: if the carbon in the cladding layer is all in amorphous SP3 form, the conductivity is poor; if it is all in graphitized SP2 form, although the conductivity is good, there are few lithium ion pathways, which is not conducive to lithium (de)intercalation. In addition, defining the molar ratio of SP2-form carbon to SP3-form carbon within the above range can not only achieve good electrical conductivity, but also promote the transport of lithium ions, so it is beneficial to the realization of the function of the battery and its cycling performance.

The mixing ratio of SP2-form carbon and SP3-form carbon can be controlled by sintering conditions such as sintering temperature and sintering time. The molar ratio of SP2-form carbon to SP3-form carbon can be determined by Raman spectroscopy. The specific test method comprises: splitting the spectrum of the Raman test, to obtain Id/Ig (wherein Id is the peak intensity of SP3-form carbon, and Ig is the peak intensity of SP2-form carbon), thereby confirming the molar ratio of the two.

In some embodiments, doped carbon, and the mass content of the doping element in the doped carbon is 30% or less; optionally, the mass content of the doping element in the doped carbon is 20% or less. The doping elements within the above content range can not only fully improve the conductivity of the pure carbon layer, but also effectively avoid excessive surface activity caused by excessive doping of the doping elements, thereby effectively controlling the interfacial side reactions caused by excessive doping of the cladding layer.

In some embodiments, the one or more cladding layers each independently comprise doped carbon, and in the doped carbon, the doping element is nitrogen element and/or sulfur element, and the mass content of the doping element in the doped carbon is 1% to 15%; or, the doping element is phosphorus element, boron element and/or fluorine element, and the mass content of the doping element in the doped carbon is 0.5% to 5%;

optionally, the doping element is nitrogen, phosphorus, sulfur, boron or fluorine.

Since nitrogen atoms and sulfur atoms are closer to carbon atoms in terms of atomic radius and are not easy to destroy the carbon skeleton, when the doping amounts of nitrogen atoms and sulfur atoms are within the above relatively wide ranges, the conductivity of the doped carbon layer can be fully exerted, and the lithium ion transport and lithium ion desolvation capabilities can be promoted.

Since the atomic radius of phosphorus atoms, boron atoms and/or fluorine atoms is different from that of carbon atoms and excessive doping can easily destroy the carbon skeleton, when the doping amounts of phosphorus atoms, boron atoms and/or fluorine atoms are within the relatively small ranges mentioned above, the conductivity of the doped carbon layer can be fully exerted, and the lithium ion transport and lithium ion desolvation capabilities can be promoted.

In some embodiments, the one or more cladding layers each independently comprise pyrophosphate, and the pyrophosphate has an interplanar spacing in the range of 0.293-0.470 nm, optionally 0.297-0.462 nm or 0.293-0.326 nm, and more optionally 0.300-0.310 nm, and a crystal direction (111) angle in the range of 18.00°-32.57°, optionally 18.00°-32.00° or 26.41°-32.57°, more optionally 19.211°-30.846°, and further optionally 29.00°-30.00°; and/or, the one or more cladding layers each independently comprise phosphate, and the phosphate has an interplanar spacing in the range of 0.244-0.425 nm, optionally 0.345-0.358 nm, and a crystal direction (111) angle in the range of 20.00°-37.00°, optionally 24.25°-26.45°;

optionally, the first cladding layer or the second cladding layer comprises a phosphate.

The first cladding layer and the second cladding layer in the first positive electrode active material are both formed of a crystalline substance, having an interplanar spacing and angle falling within the above-mentioned ranges. Thus, the impurity phase in the cladding layer can be effectively avoided, thereby improving the gram capacity, cycling performance and rate performance of the material.

In some embodiments, the lattice change rate of the first positive electrode active material before and after complete lithium (de)intercalation is 50% or less, optionally 9.8% or less, more optionally 8.1% or less, further optionally 7.5% or less, still further optionally 6% or less, still further optionally 4% or less, still further optionally 3.8% or less, and still further optionally 2.0-3.8%.

By reducing the lattice change rate, Li ion transport can be made easier, that is, the migration ability of Li ions in the first positive electrode active material is stronger, which is beneficial to improving the rate performance of the battery. The lattice change rate can be measured by methods known in the art, such as X-ray diffraction spectroscopy (XRD).

In some embodiments, the Li/Mn antisite defect concentration of the first positive electrode active material is 5.3% or less, optionally 5.1% or less, more optionally 4% or less, further optionally 2.2% or less, further optionally 2% or less, still further optionally 1.5%-2.2% or 0.5% or less.

The Li/Mn antisite defect refers to the exchange of the positions of $Li^+$ and $Mn^{2+}$ in the lattice of $LiMnPO_4$. The Li/Mn antisite defect concentration refers to the percentage of $Li^+$ that exchanges with $Mn^{2+}$ relative to the total amount of $Li^+$ in the first positive electrode active material. $Mn^{2+}$ with antisite defects will hinder the transmission of $Li^+$, and by reducing the Li/Mn antisite defect concentration, it helps to improve the gram capacity and rate performance of the first positive electrode active material. The Li/Mn antisite defect concentration can be measured by methods known in the art, such as XRD.

In some embodiments, the surface oxygen valence state of the first positive electrode active material is −1.55 or less, optionally −1.82 or less, more optionally −1.88 or less, further optionally −1.90 or less or −1.98 to −1.88, still further optionally −1.98 to −1.89, and still further optionally −1.98 to −1.90.

By reducing the surface oxygen valence state, the interfacial side reactions between the first positive electrode active material and the electrolyte solution can be reduced, thus improving the cycling performance and high-temperature stability of the battery. The surface oxygen valence can be measured by methods known in the art, such as by electron energy loss spectroscopy (EELS).

In some embodiments, the positive electrode active material composition satisfies $0.0004 \leq w_a \times y \times (3.4-V_B) \leq 0.063$, and optionally, $0.0015 \leq w_a \times y \times (3.4-V_B) \leq 0.045$.

$w_a$ represents the weight content of the first positive electrode active material based on the total weight of the positive electrode active material composition.

y is the molar quantity of element B in 1 mole of the compound represented by formula (I), and y can be used to detect the element content by inductively coupled plasma emission spectroscopy (ICP).

$V_B$ is the voltage plateau of the element B in the compound represented by formula (I), in V (volt). $V_B$ can be tested as follows: at 25° C., let the battery stand for 10 min, and discharge it at 0.33 C to the lower cut-off voltage; after standing for 10 min, charge the battery at a constant current of 0.33 C to the upper cut-off voltage, and continue to charge at constant voltage until the current is ≤0.05 C; after standing for 10 min, discharge the battery at 0.33 C to the lower cut-off voltage, and obtain the discharge capacity of the battery, marked as C0; after standing for 10 min, charge the battery at a constant current of 0.04 C0 to the upper cut-off voltage, and continue to charge at constant voltage until the current is ≤0.05 C0; after standing for 10 min, discharge the battery at 0.04 C0 to the lower cut-off voltage, and obtain the discharge capacity of the battery, marked as C1, and make a discharge differential capacity dQ/dV curve based on the discharge curve, and take the peak less than 3.4V on the dQ/dV curve as the peak of element B, and the voltage corresponding to the peak is $V_B$.

The battery is a battery comprising the positive electrode active material composition.

When the positive electrode active material composition further meets the above conditions, it helps the positive electrode plate to have both high compacted density and high compacted density efficiency, and helps the battery to have both high energy density and long service life.

In some embodiments, the second positive electrode active material comprises layered oxide.

The second positive electrode active material has high compacted density, but is costly and generally has more side reactions during battery use and has a relatively poor crystal structure stability. By reasonably combining the first positive electrode active material with the second positive electrode active material, it can improve the actual stacking density of the positive electrode active material composition, improve the compacted density and compacted density efficiency of the positive electrode plate, and thereby enabling the battery using the positive electrode active material composition to have higher energy density and longer service life.

In some embodiments, the second positive electrode active material includes a compound represented by formula (II), $$Li_{a1}A^1_{b1}Ni_{c1}Co_{d1}B^1_{e1}C^1_{f1}O_{2-g1}D^1_{g1}, \quad (II)$$

$A^1$ includes one or more elements selected from group IA, group IIA, group VIII, group VIB, and group IIB; $B^1$ includes Mn and/or Al; $C^1$ includes one or more elements selected from group IA, group IIA, group IIIA, group IVA, VA, group VIA, group IIB, group IIIB, group IVB, group VB, group VIB and group VIII; $D^1$ includes one or more elements selected from group VIA and group VIIA; a1 is selected from the range of 0.8 to 1.2; b1 is selected from the range of 0 to 0.2; c1 is selected from the range of 0 to 1; d1 is selected from the range of 0 to 1; e1 is selected from the range of 0 to 1; f1 is selected from the range of 0 to 0.1; g1 is selected from the range of 0 to 0.1; and c1+d1+e1+f1=1.

In some embodiments, $A^1$ includes one or more elements selected from Na, K, Mg, Rb, Zn and Zr; and/or, $C^1$ includes one or more elements selected from Al, Mg, Ca, Na, Ti, W, Zr, Sr, Cr, Fe, Zn, Ba, Mo, V, Ce, Nb, Sb, Ta, Ge, Nb, Sc, Ba, B, S and Y, and optionally includes one or more elements selected from Al, Ti, Zr, Nb, Sr, Sc, Sb, Y, Ba and B; and/or, $D^1$ includes one or more elements selected from N, S, F, Cl and Br, and optionally includes S and/or F; and/or, a1 is selected from the range of 0.9 to 1.1; and/or, b1 is selected from the range of 0 to 0.1; and/or, c1 is selected from the range of 0.314 to 0.990, and optionally from the range of 0.500 to 0.990; and/or, d1 is selected from the range of 0 to 0.320, and optionally from the range of 0 to 0.150; and/or, e1 is selected from the range of 0.001 to 0.450, and optionally from the range of 0.005 to 0.4; and/or, f1 is selected from the range of 0.001 to 0.1, and optionally from the range of 0.001 to 0.05; and/or, g1 is selected from the range of 0 to 0.01, and optionally from the range of 0.01 to 0.05.

In some embodiments, the second positive electrode active material comprises an inner core and a shell cladding the inner core, the inner core comprises the compound represented by formula (II); the shell comprises one or more cladding layers; and each cladding layer has ionic conductivity and/or electronic conductivity.

The one or more cladding layers each independently comprise one or more selected from phosphate, pyrophosphate, carbon, doped carbon, oxide, and fast ion conductor, and optionally comprise one or more selected from phosphate, pyrophosphate, and oxide.

In some embodiments, the one or more cladding layers each independently comprise one or more elements selected from Al, Zr, Mg, Ba, Cd, Zn, Ti, Co, W, Y, Si, Sn, B, P, S, and C.

In some embodiments, the fast ion conductor includes one or more of $Li_{3\times3}La_{2/3-x3}M^2_{a3}TiN^2_{z3}O_3$, $Li_{2+2\times4}Zn_{1-x4}GeO_4$, and $LiM^3_2(PO_4)_3$, $M^2$ includes one or more elements selected from Ba and Sr, $N^2$ includes one or more elements selected from Al and Zr, $M^3$ is one or more elements selected from Zr, Ti, Ge, and Hf, $0.04 \le x3 \le 0.167$, $0 \le a3 \le 1$, $0 \le z3 \le 1$, and $-0.3 \le x4 \le 0.8$.

In some embodiments, the shell of the second positive electrode active material comprises a cladding layer; optionally, the cladding layer comprises one or more selected from phosphate, pyrophosphate, and oxide.

In some embodiments, the shell of the second positive electrode active material comprises a first cladding layer cladding the inner core and a second cladding layer cladding the first cladding layer; optionally, the first cladding layer and the second cladding layer each independently comprise one or more selected from phosphate, pyrophosphate, and oxide.

Optionally, the first cladding layer comprises one or more selected from phosphate and oxide, and the second cladding layer comprises one or more selected from pyrophosphate and oxide. Optionally, the oxide in the first cladding layer is an oxide of one or more elements selected from the group consisting of Al, Zr, Mg, Ti, Co, Y, Ba, and Cd. Optionally, the oxide in the second cladding layer is an oxide of one or more elements selected from the group consisting of B, Sn, S, P.

In some embodiments, the cladding amount of the shell of the second positive electrode active material is 0.005 wt % to 1 wt %, and optionally 0.01 wt % to 0.5 wt %, based on the weight of the inner core.

In some embodiments, the shell of the second positive active material has a thickness of 2 nm to 200 nm, and optionally 5 nm to 50 nm.

The first positive electrode active material and the second positive electrode active material may be prepared by sintering. The shell of each of the first positive electrode active material and the second positive electrode active material may be prepared by liquid-phase cladding.

Positive Electrode Plate

The positive electrode plate provided by the embodiments of the present application comprises a positive electrode current collector and a positive electrode film layer provided on at least one surface of the positive electrode current collector, the positive electrode film layer comprises a positive electrode active material, and the positive electrode active material includes the aforementioned positive electrode active material composition. The positive electrode current collector has two opposite surfaces in its own thickness direction, and the positive electrode film layer is provided on either or both of the opposite surfaces of the positive electrode current collector.

In some embodiments, the content of the positive electrode active material composition in the positive electrode film layer is 50-99.5 wt %, optionally 90-99.5 wt %, and 95-99.5 wt %, based on the total weight of the positive electrode film layer.

In some embodiments, the positive electrode film layer further comprises a third positive electrode active material, the third positive electrode active material includes one or more of lithium-rich oxide materials, lithium iron phosphate materials, spinel lithium manganate materials, and their respective modified compounds, and the modification method includes doping and/or surface cladding modification.

In some embodiments, the third positive electrode active material includes a compound represented by formula (III), $$Li_{1+p1}A^2_{q1}B^2_{r1}O_{s1}, \quad (III)$$

$0.05 \le p1 < 0.2$, $0.10 < q1 \le 0.95$, $0 \le r1 \le 0.2$, and $25 \le s1 \le 3$, $A^2$ includes one or more elements selected from Co, Ni, Mn and Al; $B^2$ includes one or more elements selected from Mg, Ti, Cr, Zr, Nb, Fe, Mo, Cu, Sb, V, P and F.

In some embodiments, the third positive active material includes one or more selected from $Li_{1.11}Ni_{0.22}Mn_{0.58}Ti_{0.02}O_2$, $Li_{1.2}Mn_{0.6}Ni_{0.2}O_2$, $Li_{1.16}Ni_{0.22}Mn_{0.6}O_2$, $Li_{1.16}Ni_{0.13}Co_{0.06}Mn_{0.59}O_2$ and $Li_{1.1}Ni_{0.2}Co_{0.2}Mn_{0.48}O_2$.

In some embodiments, the third positive electrode active material comprises an inner core and a shell cladding the inner core, the inner core comprises the compound represented by formula (III); the shell comprises one or more cladding layers; and each cladding layer has ionic conductivity and/or electronic conductivity.

In some embodiments, the one or more cladding layers each independently comprise one or more materials selected from phosphate, pyrophosphate, solid electrolyte, conductive polymer, and materials capable of reversibly (de)intercalating lithium ions.

The phosphate, pyrophosphate, and solid electrolyte can improve the ion transport properties of the third positive electrode active material.

The conductive polymer can form a uniform film with high electronic conductivity, which improves charge transfer at the positive electrode-electrolyte interface. At the same time, the conductive polymer can accommodate the volume changes of the material, thereby reducing crack formation.

The material capable of reversibly (de)intercalating lithium ions may include several different types of positive electrode active materials.

In some embodiments, the cladding amount of the shell cladding the compound represented by formula (III) is 0.1 wt % to 5 wt %, optionally 0.5 wt % to 2 wt %, based on the weight of the inner core.

In some embodiments, the thickness of the shell cladding the compound represented by formula (III) is 2 nm to 200 nm, and optionally 5 nm to 50 nm.

In some embodiments, the third positive electrode active material includes a compound represented by formula (IV), $$Li_{a2}A^3_{x2}{}^3B^3_{y2}P_{1-z2}C^3_{z2}O_{4-n2}D^3_{n2} \quad (IV)$$

$A^3$ includes one or more elements selected from group IA, group IIA, group IIIA, group IIB, group VB and group VIB; $B^3$ includes one or more elements selected from group IA, group IIA, group IIIA, group IVA, group VA, group IIB, group IVB, group VB, group VIB and group VIII; $C^3$ includes one or more elements selected from group IIIA, group IVA, group VA and group VIA; $D^3$ includes one or more elements selected from group VIA and group VIIA; a2 is selected from the range of 0.85 to 1.15; x2 is selected from the range of 0 to 0.1; y2 is selected from the range of 0.001 to 0.999; z2 is selected from the range of 0 to 0.5; and n2 is selected from the range of 0 to 0.5.

In some embodiments, $A^3$ includes one or more elements selected from Rb, Cs, Be, Ca, Sr, Ba, Ga, In, Cd, V, Ta, Cr, Zn, Al, Na, K, Mg, Nb, Mo and W, and optionally includes one or more elements selected from Zn, Al, Na, K, Mg, Nb, Mo and W; and/or, $B^3$ includes one or more elements selected from Rb, Cs, Be, Ca, Sr, Ba, In, Pb, Bi, Cd, Hf, Ta, Cr, Ru, Rh, Pd, Os, Ir, Pt, Zn, Al, Na, K, Mg, Mo, W, Ti, V, Zr, Fe, Ni, Co, Ga, Sn, Sb, Nb and Ge, and optionally includes one or more elements selected from Zn, Al, Na, K, Mg, Mo, W, Ti, V, Zr, Fe, Ni, Co, Ga, Sn, Sb, Nb and Ge; and/or, $C^3$ includes one or more elements selected from B (boron), S, Si and N; and/or, $D^3$ includes one or more elements selected from S, F, Cl, and Br; and/or, a2 is selected from the range of 0.9 to 1.1, and optionally from the range of 0.97 to 1.01; and/or, x2 is selected from the range of 0.001 to 0.005; and/or, y2 is selected from the range of 0.001 to 0.5, optionally from the range of 0.01 to 0.5, and optionally from the range of 0.25 to 0.5; and/or, z2 is selected from the range of 0.001 to 0.5, optionally from the range of 0.001 to 0.1, and more optionally from the range of 0.001 to 0.005; and/or, n2 is selected from the range of 0 to 0.1, and optionally from the range of 0.001 to 0.005.

In some embodiments, the third positive electrode active material comprises an inner core and a shell cladding the inner core, the inner core comprises a compound represented by formula (IV); and the shell is the same as the shell cladding the compound represented by formula (I), and will not be described in detail here.

In some embodiments, the third positive electrode active material includes a compound represented by formula (V), $$LiMn_{t1}A^4_{2-t1}O_4, \quad (V)$$

t1 is selected from the range of 0 to 2, and $A^4$ includes one or more elements selected from Ni, Cr, Al, Zr, V, Ti, Mo, Ru, Mg, Nb, Ba, Si, P, W, Co, Cu and Zn.

In some embodiments, the third positive electrode active material comprises an inner core and a shell cladding the inner core, the inner core comprises the compound represented by formula (V); the shell comprises one or more cladding layers; and each cladding layer has ionic conductivity and/or electronic conductivity.

In some embodiments, the one or more cladding layers each independently comprise one or more materials selected from phosphate, pyrophosphate, solid electrolyte, conductive polymer, and materials capable of reversibly (de)intercalating lithium ions.

The phosphate, pyrophosphate, and solid electrolyte can improve the ion transport properties of the third positive electrode active material.

The conductive polymer can form a uniform film with high electronic conductivity, which improves charge transfer at the positive electrode-electrolyte interface. At the same time, the conductive polymer can accommodate the volume changes of the material, thereby reducing crack formation.

The material capable of reversibly (de) intercalating lithium ions may include several different types of positive electrode active materials.

In some embodiments, the cladding amount of the shell cladding the compound represented by formula (V) is 0.1 wt % to 5 wt %, optionally 0.5 wt % to 2 wt %, based on the weight of the inner core.

In some embodiments, the thickness of the shell cladding the compound represented by formula (V) is 2 nm to 200 nm, and optionally 5 nm to 50 nm.

The third positive electrode active material may be prepared by sintering. The shell can be prepared by liquid phase cladding.

In some embodiments, the positive electrode film layer may comprise a positive electrode binder.

In some embodiments, the positive electrode binder may include vinylidene fluoride homopolymers and/or copolymers. Optionally, the comonomer may include one or more of tetrafluoroethylene, hexafluoropropylene, and propylene. Optionally, the weight proportion of the comonomer is ≤1%. As an example, the positive electrode binder may include one or more of polyvinylidene fluoride (PVDF), vinylidene fluoride-tetrafluoroethylene-propylene terpolymer, and vinylidene fluoride-hexafluoropropylene-tetrafluoroethylene terpolymer.

In some embodiments, the positive electrode binder may include one or more of polytetrafluoroethylene (PTFE), tetrafluoroethylene-hexafluoropropylene copolymer, and fluorine-containing acrylic resin.

In some embodiments, the weight average molecular weight of the positive electrode binder is 300,000 to 2,000,000.

In some embodiments, the positive electrode film layer may comprise a positive electrode conductive agent. As an example, the positive electrode conductive agent may include one or more of superconducting carbon, conductive graphite, acetylene black, carbon black, Ketjen black, carbon dots, carbon nanotubes, graphene, and carbon nanofibers, which is not limited in the present application.

In some embodiments, the positive electrode film layer may further comprise functional additives, and the functional additives may include one or more of dispersants, plasticizers, pore-forming agents, water removal additives, acid removal additives, and lithium supplements.

The dispersant may include an abc type block copolymer, wherein the a block includes polyvinyl pyrrolidone, the b block includes polyacrylic acid, and the c block includes one or more of a polytetrahydrofuran chain, a polyethylene oxide chain, a polyethylene glycol chain, a polypropylene glycol chain, and a polyoxypropylene triol chain. Optionally, the ratio of average degree of polymerization of the a block to the b block is greater than 10:1. Optionally, the ratio of average degree of polymerization of the a block to the c block is (0.1-10):1. Optionally, the weight average molecular weight of the dispersant is 2000 to 100,000.

The plasticizer may include one or more of a strong solvent (PP-SS) plasticizer, a low temperature resistant type (PP-LT) plasticizer, a low volatility (PP-LV) plasticizer, a low diffusion (SP-LD) plasticizer, a heat stable (SP-Stab) plasticizer, and a flame retardant (SP-FR) plasticizer.

Strong solvent (PP-SS) plasticizers can provide strong plasticizing properties, for example, they may include phthalates, non-phthalates (such as benzoates, tricresyl phosphate).

Low temperature resistant (PP-LT) plasticizers can also provide good low temperature resistance, for example, can include aliphatic dibasic acid esters.

Low volatility (PP-LV) plasticizers also have relatively low volatility and may include, for example, trimellitates and polyesters.

Low diffusion (SP-LD) plasticizers also have lower diffusivity and, for example, may include polyesters.

The heat stable (SP-Stab) plasticizer also has a heat-stabilizing function and may include, for example, epoxy compounds.

Flame retardant (SP-FR) plasticizers also have flame retardant functions and may include, for example, phosphate esters and halogenated hydrocarbons.

The lithium supplement may include one or more of lithium-rich oxides (such as $Li_2NiO_2$, $Li_5FeO_4$), nanocomposites and binary lithium compounds, and optionally, the number of Li atoms in the molecular formula of the lithium supplement is ≥1.5.

In some embodiments, the positive electrode current collector may be a metal foil or a composite current collector. For example, as the metal foil, an aluminum foil can be used. The composite current collector may comprise a polymer material substrate layer and a metal layer formed on at least one surface of the polymer material substrate layer. The composite current collector may be formed by forming a metal material (such as aluminum, aluminum alloy, nickel, nickel alloy, titanium, titanium alloy, silver, and silver alloy) on a high molecular material substrate (such as a substrate of polypropylene (PP), polyethylene terephthalate (PET), polybutylene terephthalate (PBT), polystyrene (PS), or polyethylene (PE)).

The positive electrode plate does not exclude other additional functional layers other than the positive electrode film layer. For example, in some embodiments, the positive electrode plate may further comprise a functional coating, and the functional coating may be located between the positive electrode current collector and the positive electrode film layer and/or located on a surface of the positive electrode film layer facing away from the positive electrode current collector. As an example, the functional coating may comprise one or more of conductive carbon, a water removal additive, an acid removal additive, and a lithium supplement, which is not limited in the embodiments of the present application. In some embodiments, the thickness of the functional coating can be 0.1 μm-10 μm.

The positive electrode plate may be prepared by: dispersing the above components, such as the positive electrode active material composition, the conductive agent, the binder and any other component, for preparing the positive electrode plate in a solvent (such as N-methyl pyrrolidone) to form a positive electrode slurry; and coating the positive electrode slurry on the positive electrode current collector, and performing oven drying and cold pressing processes to obtain the positive electrode plate.

Negative Electrode Plate

In some embodiments, the negative electrode plate comprises a negative electrode current collector and a negative electrode film layer provided on at least one surface of the negative electrode current collector, where the negative electrode film layer includes a negative electrode active material. For example, the negative electrode current collector has two surfaces opposite to each other in its own thickness direction, and the negative electrode film layer is provided on either or both of the two opposite surfaces of the negative electrode current collector.

In some embodiments, the negative electrode current collector may be a metal foil or a composite current collector. For example, a copper foil can be adopted as the metal foil. The composite current collector may include a high molecular material substrate layer and a metal layer formed on at least one surface of the high molecular material substrate. The composite current collector can be formed by forming a metal material (e.g., copper, copper alloy, nickel, nickel alloy, titanium, titanium alloy, silver and silver alloy, etc.) on the high molecular material substrate (e.g., polypropylene (PP), polyethylene terephthalate (PET), polybutylene terephthalate (PBT), polystyrene (PS), polyethylene (PE), etc.).

In some embodiments, the thickness of the negative electrode current collector may be 3 μm-20 μm.

In some embodiments, the negative electrode active material may include one or more of carbon-based materials, silicon-based materials, tin-based materials and lithium titanate. The carbon-based material may include one or more of graphite (such as artificial graphite, natural graphite), soft carbon and hard carbon. The silicon-based material may include one or more of elemental silicon, a silicon-oxygen compound, a silicon-carbon composite, a silicon-nitrogen composite and a silicon alloy. The tin-based material may include one or more of elementary tin, a tin oxide and a tin alloy.

In some embodiments, the negative electrode active material may include a carbon-based material, or a combination of a carbon-based material and a silicon-based material.

In some embodiments, the negative electrode active material may include a carbon-based material, and the carbon-based material includes graphite, or a combination of graphite and hard carbon. Optionally, the graphite may have a porous structure. Optionally, the gram capacity of graphite may be greater than or equal to 340 mAh/g.

In some embodiments, the negative electrode active material may include a combination of a carbon-based material and a silicon-based material, the carbon-based material includes graphite, or a combination of graphite and hard carbon, and the content of the silicon element in the negative electrode active material is greater than 0 and less than or equal to 30 wt %, based on the total weight of the negative electrode active material.

In some embodiments, the negative electrode film layer may comprise a negative electrode binder. As an example, the negative electrode binder may include one or more of styrene butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA), and carboxymethyl chitosan (CMCS), which is not limited in the embodiments of the present application.

In some embodiments, the negative electrode film layer may further comprise a negative electrode conductive agent. As an example, the negative electrode conductive agent may include one or more of superconducting carbon, conductive graphite, acetylene black, carbon black, Ketjen black, carbon dots, carbon nanotubes, graphene, and carbon nanofibers, which is not limited in the present application.

In some embodiments, the negative electrode film layer may further comprise other agents, for example, a thickener (such as sodium carboxymethyl cellulose (CMC)).

In some embodiments, the porosity of the negative electrode film layer is 20% to 50%.

The negative electrode plate does not exclude other additional functional layers other than the negative electrode film layer. In some embodiments, the negative electrode plate may further comprise a functional coating, and the functional coating may be located between the negative electrode current collector and the negative electrode film layer and/or located on a surface of the negative electrode film layer facing away from the negative electrode current collector. Optionally, the functional coating may include carbon.

In some embodiments, the negative electrode film layer may further include a lithium-supplementing material. Optionally, the lithium-supplementing material includes one or more of lithium foil, lithium ribbon, lithium powder, and a pre-lithiation reagent. Optionally, the pre-lithiation reagent may include one or more of Li-aromatic hydrocarbons and complexes of Li-aromatic hydrocarbons and ether solvents, and may optionally include one or more of lithium naphthalene and lithium biphenyl-dimethyl ether (DME).

In some embodiments, the negative electrode plate comprises a negative current collector and a first negative electrode film layer and a second negative electrode film layer respectively provided on two surfaces of the negative electrode current collector. The composition of the first negative electrode film layer may be the same as or different from that of the second negative electrode film layer; the thicknesses of the first negative electrode film layer may be the same as or different from that of the second negative electrode film layer.

In some embodiments, the thickness ratio of the first negative electrode film layer to the second negative electrode film layer is 5:95 to 95:5.

The negative electrode plate can be prepared by the following steps: dispersing the components for preparing the negative electrode plate, such as the negative electrode active material, the negative electrode conductive agent, the negative electrode binder and any other component into a solvent (such as deionized water) to form a negative electrode slurry; and coating the negative electrode current collector with the negative electrode slurry, and performing processes of oven drying, cold pressing and the other processes to obtain the negative electrode plate.

In some embodiments, the negative electrode plate may also not comprise a negative electrode active material capable of (de)intercalating lithium ions. For example, the negative electrode plate may comprise a lithium sheet or a lithium alloy sheet; or, the negative electrode plate may comprise a mesh or foam-like three-dimensional skeleton layer; or, the negative electrode plate may comprise a negative current collector and a lithium-containing layer provided on at least one surface of the negative electrode current collector.

Electrolyte

The electrolyte serves to conduct ions between the positive electrode plate and the negative electrode plate. The type of the electrolyte is not specifically limited in the present application and can be selected according to requirements. For example, electrolytes may include one or more of liquid electrolytes (also known as electrolyte solutions), all-solid electrolytes, and gel electrolytes In some embodiments, the electrolyte is liquid and comprises a lithium salt, a non-aqueous solvent in which the lithium salt is dissolved, and optional additives.

In some embodiments, the lithium salt may include one or more selected from $LiPF_6$, $LiBF_4$, $LiN(SO_2F)$ 2, $LiN(CF_3SO_2)_2$, $LiClO_4$, $LiAsF_6$, $LiB(C_2O_4)_2$, $LiBF_2C_2O_4$, and $LiPO_2F_2$.

In some embodiments, the concentration of the lithium salt may be 0.5-1.5 mol/L.

In some embodiments, the non-aqueous solvent may include one or more selected from propylene carbonate, ethylene carbonate, butene carbonate, dimethyl carbonate, diethyl carbonate, dipropyl carbonate, ethyl methyl carbonate, methyl propyl carbonate, ethyl propyl carbonate, methyl formate, ethyl acetate, methyl butyrate, ethyl butyrate, methyl propionate, ethyl propionate, propyl propionate, methyl acrylate, ethylene sulfite, propylene sulfite, dimethyl sulfite, diethyl sulfite, anhydride, N-methylpyrrolidone, acetonitrile, sulfolane, dimethyl sulfoxide, dimethyl sulfide, γ-butyrolactone, and tetrahydrofuran.

In some embodiments, the additive may include one or more of negative electrode film-forming additives, positive electrode film-forming additives, additives for improving overcharge performance of batteries, additives for improving high-temperature performance of batteries, additives for improving low-temperature power performance of batteries, water removing additives, acid removing additives, and additives capable of complexing with transition metal ions, and the like. As an example, the additive may include one or more selected from cyclic carbonate compounds containing carbon-carbon double bonds, halogen-substituted cyclic carbonate compounds, nitrile and polynitrile compounds, phosphazene compounds, aromatic hydrocarbons and halogenated aromatic hydrocarbon compounds, isocyanate compounds, acid anhydride compounds, sulfate compounds, sulfite compounds, sulfonate compounds, disulfonate compounds, borate compounds, phosphate compounds, amide compounds, carbodiimide compounds, crown ethers and azacrown ether compounds, and their respective derivatives, optionally including vinylene carbonate (VC), 1,2,3-tris(2-cyanoethoxy)propane (TCP), 1-aza-12-crown 4-ether, N,N'-dicyclohexylcarbodiimide (A12 C4), N,N'-diisopropylcarbodiimide, N,N-dimethylformamide, N,N-diethylformamide, N,N-dimethylacetamide, tris(hexafluoroisopropyl)borate, tris(2,2,3,3-tetrafluoropropyl)borate, and tris(pentafluorophenyl)borate.

In some embodiments, the content of the additive may be greater than or equal to 10%, based on the total weight of the electrolyte solution.

Separator

In some embodiments, the battery cell further comprises a separator. The type of the separator is not particularly limited in the present application, and any well-known separator with a porous structure having good chemical stability and mechanical stability can be selected.

In some embodiments, the separator comprises a porous substrate. The material of the porous substrate can include at least one of glass fiber, non-woven fabric, polyethylene, polypropylene, polyvinylidene fluoride, polytetrafluoroethylene, polyester and polyimide. The porous substrate can be either a single-layer film or a multilayer composite film without special limitations. When the porous substrate is a multilayer composite film, the materials of the layers can be the same or different without special limitations.

In some embodiments, the separator may further comprise a coating located on at least one surface of the porous substrate. Optionally, the coating comprises one or more of inorganic heat resistant particles and organic heat resistant particles.

In some embodiments, the porosity of the separator is 10%-40%.

In some embodiments, the thickness of the separator is 3 μm-20 μm.

The present application further provides an electrical apparatus, comprising at least one of the battery cell, battery module, or battery pack provided in the present application. The battery cell, battery module or battery pack may be used as a power source of the electrical apparatus, or may be used as an energy storage unit of the electrical apparatus. The electrical apparatus may include, but is not limited to, a mobile device (such as a mobile phone or a laptop), an electric vehicle (such as an all-electric vehicle, a hybrid electric vehicle, a plug-in hybrid electric vehicle, an electric bicycle, an electric scooter, an electric golf cart, or an electric truck), an electric train, a ship, a satellite, or an energy storage system.

The electrical apparatus may select the battery cell, the battery module, or the battery pack according to use requirements thereof.

Figure 6:
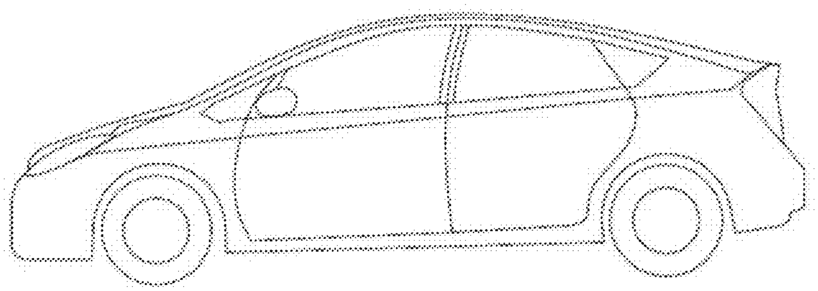
FIG. 6 is a schematic view of an embodiment of an electrical apparatus using the battery of the present application as a power supply.

FIG. 6 shows an electrical apparatus as an example. The electrical apparatus is an all-electric vehicle, a hybrid electric vehicle, a plug-in hybrid electric vehicle, or the like. In order to meet the requirements of the electrical apparatus for high power and high energy density, a battery pack or a battery module may be used.

As another example, the electrical apparatus may be a mobile phone, a tablet personal computer, a laptop, etc. The electrical apparatus is generally required to be thin and light, and may use a battery cell as a power source.

EXAMPLES

The following Examples more specifically describe the contents disclosed in the present application. These Examples are intended for illustrative purposes only, because various modifications and changes made within the scope of the contents disclosed in the present application are apparent to those skilled in the art. Unless otherwise stated, all parts, percentages, and ratios reported in the following Examples are based on mass, all reagents used in the Examples are either commercially available or synthesized according to conventional methods, and may be directly used without further processing, and all the instruments used in the Examples are commercially available.

The Batteries in Examples 1-26 and Comparative Example 3 are all Prepared According to a Method Below

Preparation of Positive Electrode Plate

The first positive electrode active material and second positive electrode active material shown in Table 1 and Table 2, conductive agent acetylene black, and binder polyvinylidene fluoride (PVDF) in a mass ratio of 96:2:2 were fully stirred and mixed in an appropriate amount of solvent NMP to form a homogeneous positive electrode slurry; the positive electrode slurry was uniformly coated onto two surfaces of the positive electrode current collector aluminum foil, dried and cold pressed to give a positive electrode plate.

Preparation of Negative Electrode Plate

Graphite as negative electrode active material, styrene butadiene rubber (SBR) as binder, carboxymethyl cellulose sodium (CMC-Na) as thickener, and carbon black (Super P) as conductive agent in a weight ratio of 96.2:1.8:1.2:0.8 were sufficiently stirred and mixed in an appropriate amount of deionized water as solvent to form a homogeneous negative electrode slurry; and the negative electrode slurry was uniformly coated onto the surface of the negative electrode current collector copper foil, dried, and cold pressed to give a negative electrode plate.

Preparation of Electrolyte Solution

Ethylene carbonate (EC), ethyl methyl carbonate (EMC), and diethyl carbonate (DEC) were mixed in a volume ratio of 1:1:1 to obtain an organic solvent, and then fully dried $LiPF_6$ was dissolved in the above organic solvent to prepare an electrolyte solution with a concentration of 1 mol/L.

Preparation of Separator

A porous polyethylene film was used as the separator.

Preparation of Battery

The positive electrode plate, the separator, and the negative electrode plate were stacked in sequence and wound to give a electrode assembly; the electrode assembly was placed in an outer package; after drying, the electrolyte solution was injected thereto, and the system underwent processes such as vacuum encapsulation, standing, formation, and shaping to give a battery.

Comparative Example 1

The preparation method for the battery is the same as that of Example 1, except for the preparation of the positive electrode plate.

The second positive electrode active material shown in Table 1, conductive agent acetylene black, and binder polyvinylidene fluoride (PVDF) in a mass ratio of 96:2:2 were fully stirred and mixed in an appropriate amount of solvent NMP to form a homogeneous positive electrode slurry; the positive electrode slurry was uniformly coated onto two surfaces of the positive electrode current collector aluminum foil, dried and cold pressed to give a positive electrode plate.

Comparative Example 2

The preparation method for the battery is the same as that of Example 1, except for the preparation of the positive electrode plate.

The first positive electrode active material shown in Table 1, conductive agent acetylene black, and binder polyvinylidene fluoride (PVDF) in a mass ratio of 96:2:2 were fully stirred and mixed in an appropriate amount of solvent NMP to form a homogeneous positive electrode slurry; the positive electrode slurry was uniformly coated onto two surfaces of the positive electrode current collector aluminum foil, dried and cold pressed to give a positive electrode plate.

In Tables 1 and 2, NCM523 refers to $LiNi_{0.5}Co_{0.2}Mn_{0.3}O_2$, and LMFP refers to carbon-cladded $LiMn_{0.7}Fe_{0.3}PO_4$.

The NCM523 and LMFP in each of the Examples and Comparative Examples can be purchased commercially, and then a variety of commercially available materials were screened by selecting a suitable sieve and then mixed in a predetermined ratio to obtain the material; or, the commercially available materials were first ball-milled to a suitable size, screened by selecting a suitable sieve, and then mixed in a predetermined ratio to obtain the material; or, sintering method was adopted and the sintering process parameters (such as sintering temperature, sintering time, sintering atmosphere, and the like) and grinding parameters (such as grinding speed, grinding time, and the like) were adjusted, and a suitable sieve was selected for screening to obtain the material; or, a variety of materials of different sizes prepared by sintering method were mixed in a predetermined ratio to obtain the material.

$w_a$ represents the weight content of the first positive electrode active material based on the total weight of the positive electrode active material composition. $w_b$ represents the weight content of the second positive electrode active material based on the total weight of the positive electrode active material composition.

$P_1$ is the powder compacted density of the first positive electrode active material at 30000N. $P_2$ is the powder compacted density of the second positive electrode active material at 30000N.

PD represents the compacted density of the positive electrode film layer.

Compacted density efficiency of positive electrode plate=$PD/[(P_1 \times w_a)+(P_2 \times w_b)]$. $(P_1 \times w_a)+(P_2 \times w_b)$ represents the theoretical compacted density of the positive electrode active material composition.

y is the molar quantity of element Fe in LMFP, i.e., 0.3.

$V_B$ is the voltage plateau of element Fe in LMFP, in V (volt).

In the particle size distribution curve of the positive electrode active material composition, the volume distribution peak with the maximal peak intensity is marked as the first peak, and the volume distribution particle size corresponding to the maximal peak intensity of the first peak is marked as Dv1, the volume distribution peak with the submaximal peak intensity is marked as the second peak, and the volume distribution particle size corresponding to the maximal peak intensity of the second peak is marked as Dv2.

Figure 7:
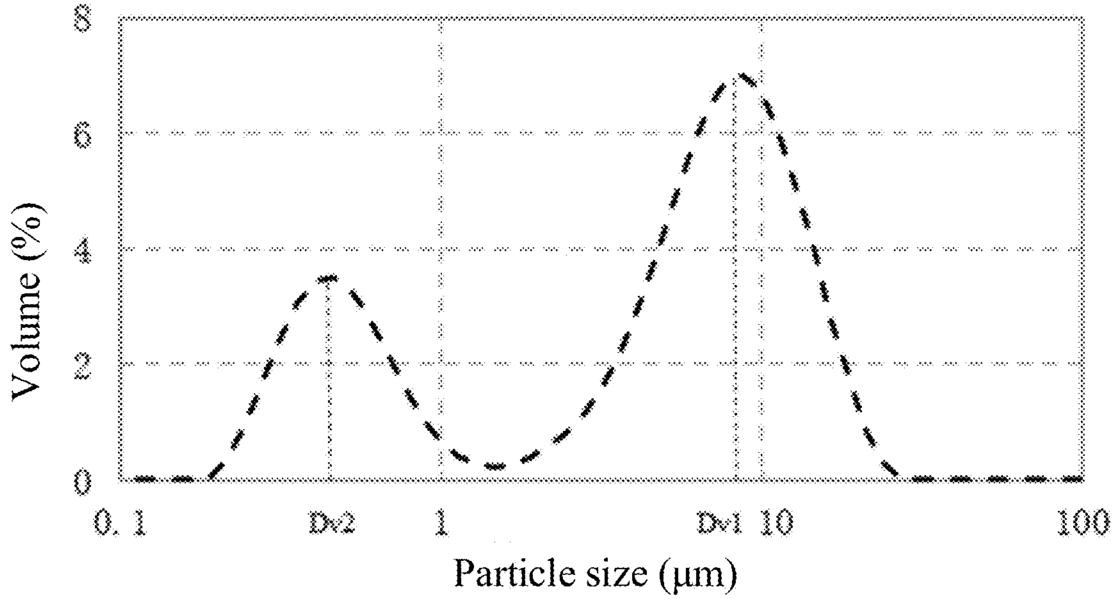
FIG. 7 is a particle size distribution curve of the positive electrode active material composition of Example 11.

FIG. 7 is the particle size distribution curve of the positive electrode active material composition of Example 11. As shown in FIG. 7, in the particle size distribution curve of the positive electrode active material composition, the peak on the left is the second peak (i.e., the volume distribution peak with the submaximal peak intensity), and the peak on the right is the first peak (i.e., the volume distribution peak with the maximal peak intensity).

The above parameters can be measured according to the test methods given above.

In Table 1, the first positive electrode active material is mainly composed of monocrystals, accounting for 90% or more of the total. The second positive electrode active materials of Examples 1-11 are mainly composed of polycrystals, accounting for 90% or more of the total. The second positive electrode active materials of Examples 12-16 are mainly composed of monocrystals, accounting for 90% or more of the total.

In Table 2, the first positive electrode active material is mainly composed of monocrystals, accounting for 90% or more of the total. The second positive electrode active materials of Examples 17-21 are mainly composed of monocrystals, accounting for 90% or more of the total. The second positive electrode active materials of Examples 22-26 are mainly composed of polycrystals, accounting for 90% or more of the total.

Testing Section

At 25° C., the battery was charged at a constant current of 1 C to 4.3V, and then charged at a constant voltage until the current was 0.05 C. At this point, the battery was fully charged, and the charge capacity at this moment was recorded as the charge capacity at cycle 1. After the battery was left to stand for 5 min, it was discharged at a constant voltage of 1 C to 2.8V. This is one cycle of charge and discharge. The discharge capacity at this moment was recorded as the discharge capacity at cycle 1. The battery was subjected to a cyclic charge-discharge test by the above approach, the discharge capacity after each cycle was recorded until the discharge capacity fade of the battery was 80% of the discharge capacity at cycle 1, and the number of cycles at this moment represents the cycling performance of the battery. The higher the number of cycles of the battery, the better its service life.

It can be seen from the test results in Table 1 and Table 2 that when the particle size distribution curve of the positive electrode active material composition satisfies $0<|Dv1-Dv2|/Dv1 \leq 50$, the positive electrode plate using the positive electrode active material composition can have both high compacted density and high compacted density efficiency, thereby enabling the secondary battery to have high energy density and long service life.

The preparation methods for the batteries of Examples 27-31 are similar to that of Example 4, except that the types of the first positive electrode active materials are different, as shown in Table 3 for details.

The first positive electrode active materials of Examples 27-31 were obtained using sintering method by adjusting sintering process parameters (such as sintering temperature, sintering time, sintering atmosphere and the like), grinding parameters (such as grinding speed, grinding time and the like), and selecting a suitable sieve for screening; or, by mixing a plurality of materials of different particle sizes prepared by sintering method in a predetermined ratio.

It can be seen from the test results in Table 3 that by doping specific elements at the Mn site, Li site, P site and/or O site of $LiMnPO_4$, optionally doping specific elements at the Mn site and P site of $LiMnPO_4$, and more optionally at the Li site, Mn site, P site and O site of $LiMnPO_4$, the compacted density of the positive electrode plate can be further improved, the energy density of the battery can be improved, and the cycling performance of the battery can be improved.

It should be noted that the present application is not limited to the above embodiments. The above embodiments are only examples, and embodiments that have the same composition and exert the same effect as the technical ideas within the scope of the technical solution of the present application are included in the technical scope of the present application. In addition, without departing from the scope of the subject matter of the present application, various modifications that can be conceived of by those skilled in the art and are applied to the embodiments, and other embodiments constructed by combining some of the constituent elements of the embodiments are also encompassed within the scope of the present application.

TABLE 1

| | First positive electrode active material | | | | | | Second positive electrode active material | | | | |
|---|---|---|---|---|---|---|---|---|---|---|---|
| No. | Type | Dv10 (μm) | Dv50 (μm) | $P_1$ (g/cm³) | Content $w_a$ | $V_B$ (V) | Type | Dv10 (μm) | Dv50 (μm) | $P_2$ (g/cm³) | Content $w_b$ |
| Comparative Example 1 | / | / | / | / | / | / | NCM523 | 6.6 | 12.0 | 3.53 | 100% |
| Comparative Example 2 | LMFP | 0.1 | 0.4 | 2.25 | 100% | / | / | / | / | / | / |

TABLE 1-continued

| | | | | | | | | | | | |
|---|---|---|---|---|---|---|---|---|---|---|---|
| Comparative Example 3 | LMFP | 0.1 | 0.4 | 2.25 | 60% | 3.30 | NCM523 | 12.0 | 15.5 | 3.58 | 40% |
| Example 1 | LMFP | 0.1 | 0.4 | 2.25 | 0.5% | 3.12 | NCM523 | 6.6 | 12.0 | 3.53 | 99.5% |
| Example 2 | LMFP | 0.1 | 0.4 | 2.25 | 2% | 3.15 | NCM523 | 6.6 | 12.0 | 3.53 | 98% |
| Example 3 | LMFP | 0.1 | 0.4 | 2.25 | 15% | 3.20 | NCM523 | 6.6 | 12.0 | 3.53 | 85% |
| Example 4 | LMFP | 0.1 | 0.4 | 2.25 | 20% | 3.20 | NCM523 | 6.6 | 12.0 | 3.53 | 80% |
| Example 5 | LMFP | 0.1 | 0.4 | 2.25 | 40% | 3.22 | NCM523 | 6.6 | 12.0 | 3.53 | 60% |
| Example 6 | LMFP | 0.1 | 0.4 | 2.25 | 60% | 3.25 | NCM523 | 6.6 | 12.0 | 3.53 | 40% |
| Example 7 | LMFP | 0.1 | 0.4 | 2.25 | 85% | 3.28 | NCM523 | 6.6 | 12.0 | 3.53 | 15% |
| Example 8 | LMFP | 0.1 | 0.4 | 2.25 | 95% | 3.30 | NCM523 | 6.6 | 12.0 | 3.53 | 5% |
| Example 9 | LMFP | 0.1 | 0.4 | 2.25 | 99.5% | 3.30 | NCM523 | 6.6 | 12.0 | 3.53 | 0.5% |
| Example 10 | LMFP | 0.1 | 0.4 | 2.25 | 95% | 3.30 | NCM523 | 12.0 | 15.5 | 3.58 | 5% |
| Example 11 | LMFP | 0.1 | 0.4 | 2.25 | 20% | 3.20 | NCM523 | 2.1 | 10.0 | 3.51 | 80% |
| Example 12 | LMFP | 0.1 | 0.4 | 2.25 | 60% | 3.20 | NCM523 | 3.5 | 8.5 | 3.45 | 40% |
| Example 13 | LMFP | 0.4 | 0.6 | 2.28 | 60% | 3.18 | NCM523 | 2.3 | 5.0 | 3.43 | 40% |
| Example 14 | LMFP | 0.5 | 1.8 | 2.35 | 60% | 3.19 | NCM523 | 1.6 | 3.4 | 3.40 | 40% |
| Example 15 | LMFP | 1.0 | 2.0 | 2.41 | 60% | 3.15 | NCM523 | 1.0 | 3.0 | 3.38 | 40% |
| Example 16 | LMFP | 1.5 | 2.5 | 2.45 | 60% | 3.05 | NCM523 | 1.0 | 3.0 | 3.38 | 40% |

| | Particle size distribution curve of positive electrode active material composition | | | | Positive electrode plate | | | |
|---|---|---|---|---|---|---|---|---|
| No. | Dv1 (μm) | Dv2 (μm) | \|Dv1 − Dv2\|/Dv1 | $w_a$ × y × (3.4 − $V_B$) | Compacted density of positive electrode film layer (g/cm$^3$) | Theoretical compacted density of positive electrode active material composition (g/cm$^3$) | Compacted density efficiency | Battery cycle life (cycles) |
| Comparative Example 1 | / | / | / | / | 3.00 | 3.53 | 85.0% | 1260 |
| Comparative Example 2 | / | / | / | / | 1.94 | 2.25 | 86.2% | 1200 |
| Comparative Example 3 | 0.32 | 17.3 | 53.1 | 0.0180 | 2.10 | 2.78 | 75.5% | 430 |
| Example 1 | 12.0 | 6.5 | 0.46 | 0.0004 | 3.04 | 3.52 | 86.4% | 1440 |
| Example 2 | 12.1 | 6.2 | 0.49 | 0.0015 | 3.05 | 3.50 | 87.0% | 1510 |
| Example 3 | 11.7 | 5.9 | 0.50 | 0.0090 | 3.08 | 3.34 | 92.3% | 1530 |
| Example 4 | 11.5 | 5.2 | 0.55 | 0.012 | 3.10 | 3.27 | 94.7% | 1550 |
| Example 5 | 11.8 | 4.5 | 0.6 | 0.022 | 2.85 | 3.02 | 94.4% | 15800 |
| Example 6 | 0.50 | 11.3 | 21.6 | 0.027 | 2.55 | 2.76 | 92.3% | 1490 |
| Example 7 | 0.40 | 12.0 | 30.5 | 0.031 | 2.25 | 2.44 | 92.1% | 1540 |
| Example 8 | 0.35 | 14.2 | 39.6 | 0.029 | 2.10 | 2.31 | 90.8% | 1450 |
| Example 9 | 0.50 | 13.2 | 25.4 | 0.030 | 2.00 | 2.26 | 88.6% | 1410 |
| Example 10 | 0.35 | 17.8 | 4.99 | 0.029 | 2.01 | 2.32 | 86.8% | 1320 |
| Example 11 | 8.7 | 0.46 | 0.95 | 0.012 | 3.05 | 3.26 | 93.6% | 1480 |
| Example 12 | 0.39 | 8.1 | 19.6 | 0.036 | 2.45 | 2.73 | 89.7% | 1400 |
| Example 13 | 0.75 | 5.8 | 6.7 | 0.040 | 2.48 | 2.74 | 90.5% | 1460 |
| Example 14 | 1.8 | 4.1 | 1.3 | 0.038 | 2.65 | 2.77 | 95.7% | 1490 |
| Example 15 | 2.0 | 3.1 | 0.55 | 0.045 | 2.55 | 2.80 | 91.1% | 1440 |
| Example 16 | 2.5 | 2.8 | 0.12 | 0.063 | 2.45 | 2.82 | 86.8% | 1350 |

TABLE 2

| | First positive electrode active material | | | | | | Second positive electrode active material | | | | |
|---|---|---|---|---|---|---|---|---|---|---|---|
| No. | Type | Dv10 (μm) | Dv50 (μm) | $P_1$ (g/cm$^3$) | Content $w_a$ | $V_B$ (V) | Type | Dv10 (μm) | Dv50 (μm) | $P_2$ (g/cm$^3$) | Content $w_b$ |
| Example 17 | LMFP | 0.1 | 3.5 | 2.30 | 60% | 3.32 | NCM523 | 3.5 | 8.5 | 3.45 | 40% |
| Example 18 | LMFP | 0.5 | 3.8 | 2.32 | 60% | 3.30 | NCM523 | 2.3 | 5.0 | 3.43 | 40% |
| Example 19 | LMFP | 2.3 | 5.5 | 2.35 | 60% | 3.29 | NCM523 | 1.6 | 3.4 | 3.40 | 40% |
| Example 20 | LMFP | 4.5 | 10.5 | 2.40 | 60% | 3.28 | NCM523 | 1.0 | 3.0 | 3.38 | 40% |
| Example 21 | LMFP | 5.0 | 12.5 | 2.42 | 60% | 3.27 | NCM523 | 1.0 | 3.0 | 3.38 | 40% |
| Example 22 | LMFP | 0.1 | 3.5 | 2.30 | 60% | 0.33 | NCM523 | 12.0 | 15.5 | 3.58 | 40% |
| Example 23 | LMFP | 0.5 | 3.8 | 2.32 | 60% | 3.32 | NCM523 | 8.5 | 12.5 | 3.55 | 40% |
| Example 24 | LMFP | 2.3 | 5.5 | 2.35 | 60% | 3.32 | NCM523 | 5.5 | 8.5 | 3.52 | 40% |
| Example 25 | LMFP | 4.5 | 10.5 | 2.40 | 60% | 3.30 | NCM523 | 1.0 | 4.7 | 3.45 | 40% |
| Example 26 | LMFP | 5.0 | 12.5 | 2.42 | 60% | 3.29 | NCM523 | 0.5 | 3.8 | 3.40 | 40% |

TABLE 2-continued

| No. | Particle size distribution curve of positive electrode active material composition: Dv1 (μm) | Dv2 (μm) | \|Dv1 − Dv2\|/Dv1 | $w_a$ × y × (3.4 − $V_B$) | Positive electrode plate: Compacted density of positive electrode film layer (g/cm$^3$) | Theoretical compacted density of positive electrode active material composition (g/cm$^3$) | Compacted density efficiency | Battery cycle life (cycles) |
|---|---|---|---|---|---|---|---|---|
| Example 17 | 3.1 | 8.4 | 1.7 | 0.014 | 2.55 | 2.76 | 92.4% | 1530 |
| Example 18 | 3.5 | 5.6 | 0.60 | 0.018 | 2.45 | 2.76 | 88.6% | 1660 |
| Example 19 | 5.9 | 3.9 | 0.34 | 0.020 | 2.40 | 2.77 | 86.6% | 1690 |
| Example 20 | 10.0 | 3.4 | 0.66 | 0.022 | 2.42 | 2.79 | 86.7% | 1540 |
| Example 21 | 12.1 | 3.5 | 0.71 | 0.023 | 2.50 | 2.80 | 89.2% | 1580 |
| Example 22 | 3.0 | 14.3 | 3.8 | 0.013 | 2.55 | 2.81 | 90.7% | 2500 |
| Example 23 | 3.3 | 12.3 | 2.7 | 0.014 | 2.60 | 2.81 | 92.5% | 2430 |
| Example 24 | 6.2 | 8.7 | 0.40 | 0.014 | 2.60 | 2.82 | 92.3% | 2460 |
| Example 25 | 9.8 | 5.2 | 0.47 | 0.018 | 2.45 | 2.82 | 86.9% | 2340 |
| Example 26 | 12.3 | 4.4 | 0.64 | 0.020 | 2.43 | 2.81 | 86.5% | 2480 |

TABLE 3

| No. | First positive electrode active material: Type | Dv10 (μm) | Dv50 (μm) | $P_1$ (g/cm$^3$) | Content $w_a$ | $V_B$ (V) |
|---|---|---|---|---|---|---|
| Example 4 | $LiMn_{0.7}Fe_{0.3}PO_4/C$ | 0.1 | 0.4 | 2.25 | 20% | 3.20 |
| Example 27 | $Li_{0.999}Mn_{0.7}Fe_{0.3}P_{0.999}S_{0.001}O_4/C$ | 0.1 | 0.4 | 2.30 | 20% | 3.19 |
| Example 28 | $Li_{0.999}Mn_{0.7}Fe_{0.293}V_{0.007}P_{0.999}S_{0.001}O_4/C$ | 0.1 | 0.4 | 2.31 | 20% | 3.19 |
| Example 29 | $Li_{0.999}Mn_{0.7}Fe_{0.293}V_{0.004}Co_{0.003}P_{0.999}S_{0.001}O_4/C$ | 0.1 | 0.4 | 2.32 | 20% | 3.19 |
| Example 30 | $Li_{0.988}Mg_{0.005}Mn_{0.7}Fe_{0.25}V_{0.05}P_{0.999}S_{0.001}O_{3.999}F_{0.001}/C$ | 0.1 | 0.4 | 2.30 | 20% | 3.17 |
| Example 31 | $Li_{0.984}Mg_{0.005}Mn_{0.7}Fe_{0.15}V_{0.05}Co_{0.10}P_{0.999}S_{0.001}O_{3.995}F_{0.005}/C$ | 0.1 | 0.4 | 2.32 | 20% | 3.13 |

| No. | Particle size distribution curve of positive electrode active material composition: Dv1 (μm) | Dv2 (μm) | \|Dv1 − Dv2\|/Dv1 | $w_a$ × y × (3.4 − $V_B$) | Positive electrode plate: Compacted density of positive electrode film layer (g/cm$^3$) | Theoretical compacted density of positive electrode active material composition (g/cm$^3$) | Compacted density efficiency | Battery cycle life (cycles) |
|---|---|---|---|---|---|---|---|---|
| Example 4 | 11.5 | 5.2 | 0.55 | 0.012 | 3.10 | 3.27 | 94.7% | 1550 |
| Example 27 | 11.5 | 5.2 | 0.55 | 0.013 | 3.14 | 3.28 | 95.6% | 1640 |
| Example 28 | 11.5 | 5.2 | 0.55 | 0.013 | 3.12 | 3.29 | 94.9% | 1720 |
| Example 29 | 11.5 | 5.2 | 0.55 | 0.013 | 3.15 | 3.29 | 95.8% | 1750 |
| Example 30 | 11.5 | 5.2 | 0.55 | 0.014 | 3.12 | 3.28 | 95.0% | 1790 |
| Example 31 | 11.5 | 5.2 | 0.55 | 0.016 | 3.14 | 3.29 | 95.5% | 1830 |

What is claimed is:

1. A positive electrode active material composition, wherein the positive electrode active material composition comprises a first positive electrode active material and a second positive electrode active material having a crystal form different from that of the first positive electrode active material, the first positive electrode active material comprises a phosphate, the second positive electrode active material comprises a layered oxide, based on a total weight of the positive electrode active material composition, a weight content of the first positive electrode active material is marked as $w_a$, a weight content of the second positive electrode active material is marked as $w_b$, $w_a$ is 20% or more, $w_b$ is 80% or less, a particle size distribution curve of the positive electrode active material composition has at least two volume distribution peaks, a volume distribution peak with a maximal peak intensity is marked as a first peak, a volume distribution particle size corresponding to the maximal peak intensity of the first peak is marked as Dv1, a volume distribution peak with a submaximal peak intensity is marked as a second peak, and a volume distribution particle size corresponding to the maximal peak intensity of the second peak is marked as Dv2, with $0<|Dv1-Dv2|/Dv1\leq 50$, wherein the first positive electrode active material comprises an inner core and a shell cladding the inner core, the inner core comprises a compound represented by formula (I);

$$Li_aA_xMn_{1-y}B_yP_{1-z}C_zO_{4-n}D_n \quad (I)$$

A comprises one or more elements selected from group IA, group IIA, group IIIA, group IIB, group VB and group VIB; B comprises one or more elements selected from group IA, group IIA, group IIIA, group IVA, group VA, group IIB, group IVB, group VB, group VIB and group VIII; C comprises one or more elements selected from group IIIA, group IVA, group VA and group VIA; D comprises one or more elements selected from group VIA and group VIIA; a is 0.85 to 1.15; x is 0 to 0.1; y is 0.001 to 0.999; z is 0 to 0.5; and n is 0 to 0.5, wherein the shell comprises one or more cladding layers, each of the one or more cladding layers has ionic conductivity and/or electronic conductivity, the one or more cladding layers comprises one or more selected from pyrophosphate, phosphate, carbon, doped carbon, oxide, boride and polymer, wherein the one or more cladding layers comprises a first cladding layer cladding the inner core and a second cladding layer cladding the first cladding layer, the first cladding layer comprises one or more selected from pyrophosphate, phosphate, oxide and boride, and the second cladding layer comprises one or more selected from carbon and doped carbon.

2. The positive electrode active material composition according to claim 1, wherein, a volume distribution particle size Dv50 of the first positive electrode active material is 0.25 μm to 12.5 μm; and/or, a volume distribution particle size Dv50 of the second positive electrode active material is 2.5 μm to 16.5 μm.

3. The positive electrode active material composition according to claim 1, wherein a lattice mismatch between a material of the inner core and a material of the shell is less than 10%.

4. The positive electrode active material composition according to claim 1, wherein, based on a total weight of the first positive electrode active material, a manganese element content is 10 wt % to 35 wt %, optionally 13.3 wt % to 33.2 wt %, more optionally 15 wt % to 30 wt %, and further optionally 17 wt % to 20 wt %; and/or, a phosphorus element content is 12 wt %-25 wt %, optionally 15 wt %-20 wt %, and more optionally 16.8 wt %-19.5 wt %; and/or, a weight ratio of manganese element to phosphorus element is 0.71-1.85, optionally 0.90-1.25, and more optionally 0.95-1.20.

5. The positive electrode active material composition according to claim 1, wherein the one or more cladding layers each independently comprise carbon, and the carbon is a mixture of SP2-form carbon and SP3-form carbon;

optionally, a molar ratio of SP2-form carbon to SP3-form carbon in the carbon is any value within 0.07-13, more optionally any value within 0.1-10, and further optionally any value within 2.0-3.0.

6. The positive electrode active material composition according to claim 1, wherein, the one or more cladding layers each independently comprise doped carbon, the doped carbon comprises a doping element, and a mass content of the doping element in the doped carbon is 30% or less; optionally, the mass content of the doping element in the doped carbon is 20% or less.

7. The positive electrode active material composition according to claim 1, wherein, the one or more cladding layers each independently comprise doped carbon, the doped carbon comprises a doping element, and in the doped carbon, the doping element is nitrogen element and/or sulfur element, and a mass content of the doping element in the doped carbon is 1% to 15%; or, the doping element is phosphorus element, boron element and/or fluorine element, and a mass content of the doping element in the doped carbon is 0.5% to 5%;

optionally, the doping element is nitrogen, phosphorus, sulfur, boron or fluorine.

8. The positive electrode active material composition according to claim 1, wherein, in formula (I), A is one or more elements selected from Rb, Cs, Be, Ca, Sr, Ba, Ga, In, Cd, V, Ta, Cr, Zn, Al, Na, K, Mg, Nb, Mo and W, B is one or more elements selected from Rb, Cs, Be, Ca, Sr, Ba, In, Pb, Bi, Cd, Hf, Ta, Cr, Ru, Rh, Pd, Os, Ir, Pt, Zn, Al, Na, K, Mg, Mo, W, Ti, V, Zr, Fe, Ni, Co, Ga, Sn, Sb, Nb and Ge, C is one or more elements selected from B (boron), S, Si, and N, D is one or more elements selected from S, F, Cl and Br.

9. The positive electrode active material composition according to claim 1, wherein, the pyrophosphate is $M_b(P_2O_7)_c$, M is one or more elements selected from Li, Fe, Ni, Mg, Co, Cu, Zn, Ti, Ag, Zr, Nb, Mn, and Al, b is 1 to 4, c is 1 to 6, the phosphate is $X_m(PO_4)_q$, X is one or more elements selected from Li, Fe, Ni, Mg, Co, Cu, Zn, Ti, Ag, Zr, Nb, Mn, and Al, m is 1 to 2, q is 1 to 4, the oxide is $M'_dO_e$, M' includes one or more elements selected from Li, Be, B, Na, Mg, Al, Si, P, K, Ca, Sc, Ti, V, Cr, Mn, Fe, Co, Ni, Cu, Zn, Ga, Ge, As, Se, Sr, Y, Zr, Nb, Mo, Tc, Ru, Rh, Pd, Ag, Cd, In, Sn, Sb, Te, W, La, and Ce, d is greater than 0 and less than or equal to 2, e is greater than 0 and less than or equal to 5, the boride is $Z_vB_w$, Z is one or more elements selected from Li, Fe, Ni, Mg, Co, Cu, Zn, Ti, Ag, Zr, Nb, Mn, and Al, vis 1 to 7, and w is 1 to 2, the polymer comprises one or more selected from a polysaccharide and a polysiloxane.

10. The positive electrode active material composition according to claim 9, wherein when the polymer comprises the polysaccharide, the polysaccharide is one or more selected from pectin, carboxymethyl starch, hydroxypropyl starch, dextrin, cellulose ether, carboxymethyl chitosan, hydroxyethyl cellulose, carboxymethyl cellulose, carboxypropyl methyl cellulose, guar gum, sesbania gum, gum arabic, lithium alginate, sodium alginate, potassium alginate, fucoidan, agar, carrageenan, carrageenin, xanthan gum and fenugreek gum, when the polymer comprises the polysiloxane, the polysiloxane is one or more selected from polydimethylsiloxane, polydiethylsiloxane, polymethylethylsiloxane, polymethylvinylsiloxane, polyphenylmethylsiloxane, polymethylhydrogensiloxane, carboxyl functionalized polysiloxane, epoxy-terminated polysiloxane, methoxy-terminated polydimethylsiloxane, hydroxypropyl-terminated polydimethylsiloxane, polymethylchloropropylsiloxane, hydroxy-terminated polydimethylsiloxane, polymethyltrifluoropropylsiloxane, perfluorooctylmethylpolysiloxane, aminoethylaminopropylpolydimethylsiloxane, polyether-terminated polydimethylsiloxane, aminopropyl-branched polysiloxane, aminopropyl-terminated polydimethylsiloxane, phosphate-branched grafted polydimethylsiloxane, polyether-branched grafted polydimethylsiloxane, 1,3,5,7-octamethylcyclotetrasiloxane, 1,3,5,7-tetrahydro-1,3,5,7-tetramethylcyclotetrasiloxane, cyclopentapolydimethylsiloxane, 2,4,6,8-tetramethylcyclotetrasiloxane, 2,4,6,8-tetramethyl-2,4,6,8-tetravinylcyclotetrasiloxane, cyclic polymethylvinylsiloxane, hexadecamethylcyclooctasiloxane, tetradecamethylcycloheptasiloxane, and cyclic polydimethylsiloxane.

11. The positive electrode active material composition according to claim 9, wherein the polysaccharide comprises a sugar unit and a substituent attached to the sugar unit, the substituent is selected from —OH, —COOH, —COOLi, —COONa, —COOK, $—SO_3H$, $—SO_3Li$, $—SO_3Na$, $—SO_3K$, $—CH_2—SO_3H$, $—CH_2—SO_3Li$, $—CH_2—SO_3Na$, $—CH_2—SO_3K$, methoxy, and ethoxy.

12. A positive electrode plate, comprising a positive electrode current collector and a positive electrode film layer provided on at least one surface of the positive electrode current collector, wherein the positive electrode film layer comprises a positive electrode active material, the positive electrode active material includes the positive electrode active material composition according to claim 1, and optionally, the content of the positive electrode active material composition in the positive electrode film layer is 90 wt % to 99.5 wt %, and more optionally 95 wt % to 99.5 wt % by weight, based on a total weight of the positive electrode film layer.

13. An electrical apparatus, comprising a battery, the battery comprising the positive electrode plate according to claim 12.

14. A positive electrode active material composition, wherein the positive electrode active material composition comprises a first positive electrode active material and a second positive electrode active material having a crystal form different from that of the first positive electrode active material, the first positive electrode active material comprises a phosphate, the second positive electrode active material comprises a layered oxide, based on a total weight of the positive electrode active material composition, a weight content of the first positive electrode active material is marked as $w_a$, a weight content of the second positive electrode active material is marked as $w_b$, $w_a$ is 20% or more, $w_b$ is 80% or less, a particle size distribution curve of the positive electrode active material composition has at least two volume distribution peaks, a volume distribution peak with a maximal peak intensity is marked as a first peak, a volume distribution particle size corresponding to the maximal peak intensity of the first peak is marked as Dv1, a volume distribution peak with a submaximal peak intensity is marked as a second peak, and a volume distribution particle size corresponding to the maximal peak intensity of the second peak is marked as Dv2, with $0<|Dv1-Dv2|/Dv1\leq 50$, wherein the first positive electrode active material comprises an inner core and a shell cladding the inner core, the inner core comprises a compound represented by formula (I);

$$Li_aA_xMn_{1-y}B_yP_{1-z}C_zO_{4-n}D_n \quad (I)$$

A comprises one or more elements selected from group IA, group IIA, group IIIA, group IIB, group VB and group VIB; B comprises one or more elements selected from group IA, group IIA, group IIIA, group IVA, group VA, group IIB, group IVB, group VB, group VIB and group VIII; C comprises one or more elements selected from group IIIA, group IVA, group VA and group VIA; D comprises one or more elements selected from group VIA and group VIIA; a is 0.85 to 1.15; x is 0 to 0.1; y is 0.001 to 0.999; z is 0 to 0.5; and n is 0 to 0.5, wherein the shell comprises one or more cladding layers, each of the one or more cladding layers has ionic conductivity and/or electronic conductivity, the one or more cladding layers comprises one or more selected from pyrophosphate, phosphate, carbon, doped carbon, oxide, boride and polymer, wherein the one or more cladding layers comprises a first cladding layer cladding the inner core, a second cladding layer cladding the first cladding layer, and a third cladding layer cladding the second cladding layer, the first cladding layer comprises pyrophosphate, the second cladding layer comprises one or more selected from phosphate, oxide and boride, and the third cladding layer comprises one or more selected from carbon and doped carbon.

15. The positive electrode active material composition according to claim 14, wherein the one or more cladding layers further comprises a fourth cladding layer cladding the third cladding layer, and a fifth cladding layer cladding the fourth cladding layer, a cladding amount of the fourth cladding layer and a cladding amount of the fifth cladding layer are each independently 0.01 wt % to 10 wt %, based on a weight of the inner core.

16. The positive electrode active material composition according to claim 15, wherein a cladding amount of the fourth cladding layer and a cladding amount of the fifth cladding layer are each independently 0.01 wt % to 10 wt %, based on a weight of the inner core.

* * * * *